United States Patent [19]
Maples et al.

[11] Patent Number: 5,853,535
[45] Date of Patent: *Dec. 29, 1998

[54] PROCESS FOR MANUFACTURING BLEACHED PULP INCLUDING RECYCLING

[75] Inventors: Gerald E. Maples; Joseph R. Caron, both of Pensacola, Fla.; John A. Fleck, Westchester, Ohio

[73] Assignee: Champion International Corporation, Stamford, Conn.

[ * ] Notice: The term of this patent shall not extend beyond the expiration date of Pat. No. 5,324,528.

[21] Appl. No.: 335,099

[22] Filed: Nov. 7, 1994

Related U.S. Application Data

[60] Continuation-in-part of Ser. No. 224,690, Apr. 8, 1994, which is a division of Ser. No. 944,327, Sep. 14, 1992, Pat. No. 5,352,332, which is a continuation-in-part of Ser. No. 873,673, Apr. 24, 1992, abandoned, which is a continuation of Ser. No. 646,179, Jan. 28, 1991, abandoned.

[51] Int. Cl.$^6$ ............................. D21C 11/04; D21C 11/10
[52] U.S. Cl. ............................. 162/30.1; 162/34; 162/35; 162/38; 162/60; 162/65; 162/82; 162/88; 162/89
[58] Field of Search ............................. 162/30.1, 30.11, 162/34, 38, 60, 65, 78, 89, 29.31, 35.82

[56] References Cited

U.S. PATENT DOCUMENTS

| | | |
|---|---|---|
| 532,332 | 10/1895 | Maples et al. ............................. 162/65 |
| 3,698,995 | 10/1972 | Rapson ............................. 162/65 |
| 4,039,372 | 8/1977 | Reeve et al. ............................. 162/89 |
| 4,042,452 | 8/1977 | Arhippainen et al. ............................. 162/89 |
| 4,269,656 | 5/1981 | Perkins ............................. 162/30 |
| 4,619,733 | 10/1986 | Kooi ............................. 162/65 |
| 4,946,556 | 8/1990 | Prough ............................. 162/65 |
| 5,061,343 | 10/1991 | Azarniouch et al. . | |
| 5,300,191 | 4/1994 | Lindberg ............................. 162/30.1 |
| 5,328,563 | 7/1994 | Henricson et al. ............................. 162/30.1 |
| 5,340,440 | 8/1994 | Henricson ............................. 162/30.11 |
| 5,374,333 | 12/1994 | Nykanen et al. ............................. 162/30.1 |

FOREIGN PATENT DOCUMENTS

| | | |
|---|---|---|
| 81-020828 | 4/1981 | Sweden ............................. 162/89 |
| 81020828 | 4/1981 | Sweden . | |
| PCT/US/90/ 02823 | 5/1990 | WIPO ............................. D21C 9/147 |

OTHER PUBLICATIONS

Union Camp Leads Ozone Pulping Drive in North American Mills –Sep. 1994 –Pulp + Paper pp. 69–71.
Union Camp Begins Ozone Era with New Kraft Bleaching Line at Franklin, VA –Nov. 1992 –Pulp + Paper, pp. 42+54.
Wells E. Natt, Union Camp's Mill Eperience with Ozone Bleaching –Mar. 1994 –6 pages –Introductory Remarks –International Non–Chlorine Bleaching Conf., Amelia cls., H.
BFR: A New Process Toward Bleach Plant Closure –G. Maples et al. –10 pages –1994 International Pulp Bleaching Conf. Vancouver, B.C.
J. Robert Caron + John Fleck–Metals Management in a Closed Kraftmill Bleach Plant–Nov. 8, 1994–1994 Tappi Pulping Conference.
N. Soteland–Bleaching of Chemical Pulps with Oxygen and ozone–Presented–1973 International Pulp Bleaching Conference.

*Primary Examiner*—Steven Alvo
*Attorney, Agent, or Firm*—Richard C. Stewart, II

[57] ABSTRACT

A process for bleaching wood pulp is provided comprising subjecting the wood pulp, after brown stock washing, to an oxygen delignification stage, a washing sequence, a first chlorine dioxide bleaching stage, an oxidative extraction stage, optionally at least one final chlorine dioxide bleaching stage and then recycling the filtrate from the oxidative extraction stage counter-currently through the bleaching plant and brown stock washing. Additionally, and quite beneficially, the filtrate from the first chlorine dioxide bleaching stage is also recycled counter-currently through the brown stock washing thereby significantly reducing the environmental impact associated with the manufacture of bleach wood pulp.

52 Claims, 7 Drawing Sheets

PROCESS FOR MANUFACTURING BLEACHED PULP INCLUDING RECYCLING

CROSS-REFERENCE TO RELATED APPLICATIONS

This application is a continuation-in-part of application Ser. No. 224,690 filed Apr. 8, 1994, which in turn is a divisional of application Ser. No. 944,327 filed Sep. 14, 1992 now U.S. Pat. No. 7,352,332, which, in turn, is a continuation-in-part of application Ser. No. 873,673, filed Apr. 24, 1992, now abandoned, which, in turn, is a continuation of application Ser. No. 646,179, filed Jan. 28, 1991, now abandoned.

FIELD OF THE INVENTION

This invention relates to an improved method for manufacturing bleached pulp. More particularly, this invention relates to improvements in processes for the manufacture of bleached pulp including a recycling process for reducing the environmental impact associated with the manufacture of bleached wood pulp.

BACKGROUND OF THE INVENTION

In the conventional Kraft process, wood pulp is produced by digestion of wood chips in a pulping liquor usually containing sodium hydroxide and sodium sulfide as the active pulping chemicals. Following the wood digestion process, pulp is separated from the spent pulping liquor. The spent pulping liquor is then recovered and regenerated for recycling. The Kraft process wood pulp is then bleached and purified in a bleach plant operation. In the bleach plant, pulp is subjected to at least one bleaching stage under acidic conditions with a bleaching agent such as ozone, chlorine, chlorine dioxide, mixtures of chlorine and chlorine dioxide and the like, followed by at least one bleaching stage under alkaline conditions with a bleaching agent such as hydrogen peroxide, oxygen in the presence of base or a combination thereof. Depending on the desired pulp brightness, additional acidic or alkaline bleaching stages are employed. Following each bleaching stage, spent bleaching chemicals are usually removed from the pulp by washing with a suitable source of water; as for example fresh water or previously used water from pulp washing or a combination of the two. Current state of the art requires that all wash water from the bleach plant along with spent bleaching chemicals be discharged to the sewer as effluents rather than being processed in the pulping liquor regeneration operation noted above. Various concerns have prevented the recovery of these bleach plant effluents in the pulping liquor regeneration operation. One concern is the possible build-up of chlorides usually as by-products of bleaching with chlorine based bleaching agents, as components of wood fiber entering the pulping process or the like, which causes corrosion and operational problems. Another concern is the lack of adequate systems for removing non-process metals, such as calcium, magnesium and manganese, which enter the bleach plant from the wood fiber and are typically removed with wash water and spent bleach chemicals. Further, the use of large volumes of water for pulp washing in the bleach plant has also prevented recovery of bleach plant effluents due to the resulting high evaporator load. The environmental impact of these practices has been widely noted and attempts have been made to reduce the impact. See for example U.S. Pat. Nos. 3,698,995; 4,039,372; 5,127,992; 4,042,452; and 4,619,733 PCT/WO 91/18145; Pap. S. Afr., 10, No. 5; 32, 34 and 36 (September /October. 1990); and Swedish Patent No. 81-020828. Despite these serious concerns and attempts, the ability to overcome the problems associated with recovery as described above has not been developed. See for example, "Union camp Leads Ozone Pulping Drive in North American Mills", *Pulp and Paper*, p. 69, (September 1944); "Union Camp Begins Ozone Era With New Kraft Bleaching Line at Franklin, Va.", *Pulp and Paper*, p. 42 (November 1992); Wells E. Nutt, "Union Camp's Mill Experience With Ozone Bleaching", Introductory Remarks to a Panel Discussion at the International Non-Chlorine Bleaching Conference, Amelia Island, Fla., March, 1994; and Paper ja Puu—Paper and Timber; May 1989.

SUMMARY OF THE INVENTION

One aspect of this invention relates to a process for manufacturing bleached wood pulp comprising subjecting wood pulp having a Kappa Number equal to or less than about 30 (preferably equal or less than about 25, more preferably equal to or less than about 20 and most preferably from about 5 to about 20) after one or more brown stock washing stages to the following steps conducted in sequence:

a first acidic bleaching stage wherein the pH at some point during said bleaching stage is less than 7, (preferably equal to or less than about 6, more preferably equal to or less than about 5 and most preferably from about 1 to about 5) as for example, bleaching under acidic conditions with an active bleaching agent comprising ozone, elemental chlorine, hydrogen peroxide, chlorine dioxide, peracids such as peroxymono sulfuric acid, peroxyacetic acid, dimethyl dioxirane or mixtures thereof, preferably bleaching under acidic conditions with an active bleaching agent comprising not more than about 20% active elemental chlorine, more preferably not more than about 5% to about 10% active elemental chlorine and most preferably not more than about 5% active elemental chlorine, and in the embodiments of choice no or substantially no elemental chlorine (i.e. less than about 1% to about 5%); and a first alkaline bleaching stage wherein the pH at some point during said bleaching stage is greater than 7 (preferably equal to or greater than about 8.2, more preferably equal to or greater than about 9 and most preferably from about 9 to about 12) as for example bleaching under alkaline conditions with an active bleaching agent comprising hydrogen peroxide, oxygen in the presence of base, sodium hypochlorite or oxygen in the presence of base and peroxide, preferably an oxidative extraction with oxygen in the presence of base, more preferably such an extraction in the presence of an effective amount of hydrogen peroxide; and said process further comprising;

subjecting said pulp to an acid wash wherein the pH at some point during said acid wash is less than 7 (preferably equal to or less than about 6, more preferably equal to or less than about 5 and most preferably from about 1 to about 5) prior to said first acidic bleaching stage and after brown stock washing to remove all or a portion of non-process metals contained in said pulp;

recycling countercurrently all or a portion of the filtrate from said first acidic bleaching stage and all or a portion of the filtrate from said first alkaline bleaching stage comprising all or a portion chlorides entering said process with the wood fiber, chlorides generated in said first acidic bleaching stage or a combination thereof to said weak black liquor to form weak black liquor which comprises said chlorides;

recycling said weak black liquor to a black liquor evaporation stage to produce a strong black liquor which comprises chlorides;

combusting said strong black liquor to produce a smelt stream and a flue gas comprising particulates which comprise chlorides and sulfates and separating said smelt stream and said flue gas;

treating said flue gas to separate said particulates as ash, and treating said ash to form a component relatively low in chlorides and relatively rich in sulfates and a component relatively rich in chlorides and relatively low in sulfates;

recycling said component relatively low in chlorides and relatively rich in sulfates to said strong black liquor and discharging said component relatively rich in chlorides and relatively low in sulfates; and recycling said smelt to a causticizing system to regenerate pulping liquor.

As used herein, "filtrate" is the aqueous phase collected or recovered from a mixture of said phase and pulp, said phase comprising water and dissolved and/or suspended materials, as for example the aqueous phase removed in a pulp thickening process on a decker, an aqueous phase removed in a conventional pulp washing process and the like. As used herein, "non-process metals" are calcium, magnesium and/or manganese which enter the pulping process with the wood fiber. As used herein, "countercurrently" means the direct or indirect flow of a filtrate in the pulp manufacturing process in a direction opposite to the flow of wood fiber or pulp in the process such that all or a portion of said filtrate at some juncture in the operation of the process flows to the weak black liquor, as for example flow of filtrate from a point in the process to the next preceding point or any preceding point in the process as for example to wash pulp, dilute pulp or a combination thereof.

In a preferred aspect of this embodiment of invention, this process further comprises:

recycling countercurrently all or a portion of said filtrate from said first acidic bleaching stage and all or a portion of said filtrate from said first alkaline bleaching stage (preferably as a combined filtrate) through at least one of the brown stock washing stages as wash water then to said weak black liquor.

In a more preferred aspect of this embodiment, the process of this invention further comprises:

subjecting said pulp after said first alkaline bleaching stage to at least one post alkaline bleaching washing stage to remove all or a portion of alkaline bleaching stage solids and chlorides from said pulp to form a mixture comprising pulp and an alkaline bleach filtrate comprising solids and chlorides; and recovering all or a portion of said alkaline bleach filtrate and recycling countercurrently all or a portion of said recovered filtrate alone or incombination with all or a portion of said first acidic bleaching stage filtrate as wash water through at least one brown stock washing stage then to said weak black liquor.

Another preferred embodiment of this invention further comprises:

subjecting said pulp after said first acidic bleaching stage to at least one post acidic bleaching washing stage to remove all or a portion of acidic bleaching stage solids and chlorides from said pulp to form a mixture comprising said pulp and an acidic bleach filtrate which comprises said chlorides and said solids; and recovering all or a portion of said acidic bleach filtrate and recycling countercurrently all or a portion of said recovered filtrate alone or incombination with all or a portion of said alkaline bleach filtrate through at least one of said brown stock washing stages then to said weak black liquor.

Yet another preferred embodiment of the invention comprises:

treating said pulp after brown stock washing and prior to said acidic wash in an oxygen delignification stage to reduce the kappa number of the pulp to the desired level followed by at least one post oxygen delignification washing stage; and recycling countercurrently all or a portion of said first acidic bleach stage filtrate, said first alkaline bleach filtrate or a combination thereof as wash water through said at least one post oxygen delignification washing stage, at least one of said brown stock washing stage or a combination thereof.

Yet another more preferred embodiment of this invention comprises:

subjecting said pulp to a partial neutralization stage after the first acidic bleaching stage and prior to the alkaline bleaching stage in which the pH is raised, preferably to a value of from about 5 to 7 with said alkaline bleach filtrate.

Still another more preferred embodiment of the invention further comprises:

at least one additional bleaching stage after said at least one post alkaline bleaching washing stage and optionally treating all or a portion of the filtrate from said additional bleaching stage to reduce the amount of chlorides therein if a chlorine based bleaching agent is used.

A most preferred embodiment of this invention further comprises:

recycling countercurrently as wash water through said at least one post oxygen delignification washing stage, said at least one brown stock washing stage or a combination thereof all or a portion of said filtrates from said first acidic bleaching stage; from said partial neutralization stage; from said first alkaline bleaching stage; and from said at least one additional bleaching stage (preferably after treatment to reduce the amount of chlorides in the filtrate if a chlorine based bleaching agent is used).

Yet another most preferred aspect of this embodiment of the invention further comprises treating all or a portion of the filtrate from the acid wash to remove all or a portion of non-process metals from said filtrate and recycling all or a portion of said treated filtrate as wash water to the at least one post oxygen delignification washing stage, to the at least one post acidic bleaching washing stage or a combination thereof.

Another aspect of this invention relates to a process for manufacturing bleached wood pulp comprising subjecting wood pulp having a Kappa Number equal to or less than about 30 (preferably equal to or less than about 25, more preferably equal to or less than about 20 and most preferably from about 5 to about 20) after brown stock washing to the following steps conducted in sequence;

a first acidic bleaching stage wherein the pH at some point during said bleaching stage is less than 7 (preferably equal to or less than about 6, more preferably equal to or less than about 5 and most preferably from about 1 to about 5) as for example bleaching under acidic conditions with an active bleaching agent as for example ozone, peracids such as peroxymono sulfuric acid and peroxy acetic acid, dimethyl dioxirane, chlorine dioxide, hydrogen peroxide or mixtures thereof, preferably bleaching under acidic conditions where the active bleaching agent comprises not more than about 30% active elemental chlorine, preferably not more than about 20% active elemental chlorine, more preferably not more than about 5% to about 10% active chlorine, and most preferably no or substantially no elemental chlorine (i.e. from less than about 1% to about 5%);

a first alkaline bleaching stage wherein the pH at some point during said bleaching stage is greater than 7 (preferably equal to or greater than about 8.2, more preferably equal to or greater than about 9 and most preferably from about 9 to about 12) as for example bleaching under alkaline conditions with an active bleaching agent comprising hydrogen peroxide, oxygen in the presence of base, sodium hypochlorite or oxygen in the presence of base and peroxide, and preferably oxidative extraction with oxygen in the presence of base, preferably such extraction in the presence of an effective amount of hydrogen peroxide; and said process further comprising:

treating all or a portion of filtrate from said first acidic bleaching stage to remove all or a portion of non-process metals from said filtrate to form treated filtrate comprising all or a portion chlorides entering said process with the wood fiber, chlorides generated in said bleaching stage or a combination thereof;

recycling countercurrently all or a portion of said treated filtrate from said first acidic bleaching stage and all or a portion of filtrate from said first alkaline bleaching stage comprising all or a portion of the chlorides entering the process with the wood fiber, chlorides generated in said first acidic bleaching stage or a combination thereof to said weak black liquor to form a weak black liquor which comprises said chlorides;

recycling said weak black liquor to a black liquor evaporation stage to produce a strong black liquor which comprises chlorides;

combusting said strong black liquor to produce a smelt stream and a flue gas comprising particulates which comprise chlorides and sulfates and separating said smelt stream and said flue gas;

treating said flue gas to separate said particulates as ash and treating said ash to form a component relatively rich in chlorides and relatively low in sulfates and a component relatively low in chlorides and relatively rich in sulfates;

recycling said component relatively low in chlorides and relatively rich in sulfates to said strong black liquor and discharging said component relatively rich in chlorides and relatively low in sulfates; and recycling said smelt to a causticizing system to regenerate pulping liquor.

In the preferred embodiment of the invention, the process further comprises:

recycling countercurrently all or a portion of said filtrate from said first acidic bleaching stage and all or a portion of said filtrate from said first alkaline bleaching stage (preferably as a combined filtrate) through at least one of said brown stock washing stages as wash water then to said weak black liquor.

In a more preferred aspect of this embodiment, the process of this invention further comprises:

subjecting said pulp after said first alkaline bleaching stage to at least one post alkaline bleaching washing stage to remove all or a portion of alkaline bleaching stage solids and chlorides from said pulp to form a mixture comprising pulp and an alkaline bleach filtrate comprising solids and chlorides; and recovering all or a portion of said alkaline bleach filtrate and recycling countercurrently all or a portion of said recovered filtrate alone or in combination with all or a portion of said acidic bleach filtrate as wash water through at least one brown stock washing stage then to said weak black liquor.

Another preferred embodiment of this invention further comprises:

subjecting said pulp after said first acidic bleaching stage to at least one post acidic bleaching washing stage to remove all or a portion of acidic bleaching stage solids and chlorides from said pulp to form a mixture comprising said pulp and an acidic bleach filtrate which comprises said chlorides and said solids; and recovering all or a portion of said acidic bleach filtrate, and recycling countercurrently all or a portion of said recovered filtrate alone or in combination with all or a portion of said alkaline bleach filtrate as wash water through at least one brown stock washing stage then to said weak black liquor.

Yet another preferred embodiment of the invention further comprises:

subjecting said pulp after brown stock washing stage and prior to the first acidic bleaching stage to an oxygen delignification stage to reduce the Kappa Number of the pulp to the desired value followed by at least one post oxygen delignification washing stage; and recycling countercurrently all or a portion of said filtrates from said first alkaline bleaching stage, from said first acidic bleaching stage or a combination thereof as wash water through said at least one post oxygen delignification washing stage, said at least one brown stock washing stage or a combination thereof.

In the more preferred embodiment of the invention, the process further comprises at least one additional bleaching stage after said post alkaline bleaching washing stage in which the filtrate from said additional bleaching stage is preferably treated to reduce the amount of chlorides therein when chlorine based bleaching agents are used.

In the most preferred embodiments of the invention, the process further comprises recycling all or a portion of said filtrates from said at least one additional bleaching stage to said weak black liquor preferably through at least one post alkaline bleaching washing stage as wash water, through at least one of said at least one post oxygen delignification washing stage as wash water, through at least one of said at least one brown stock washing stage as wash water or a combination thereof, preferably in sequence.

The process of the present invention provides for the bleaching of wood pulp and for the recycling and recovery of bleach filtrates in a manner that will allow for: 1) the production of pulp with acceptable brightness and quality; 2) the reduction of dissolved solids normally discharged with bleach effluents including chlorinated organic material; 3) minimal increase in the amount of water required to be evaporated; 4) no or substantially no increased build-up of chlorides in the pulping liquor regeneration cycle; and/or 5) removal of non-process metals to prevent scale formation.

The present invention allows for a significant reduction in color, AOX, BOD and solids discharged in the effluent associated with bleaching of chemical pulp to a degree that represents a significant improvement relative to current practice. Furthermore, the present invention accomplishes this in a manner that represents a significant improvement over previously developed techniques that attempted various approaches for bleach filtrate recovery.

DETAILED DESCRIPTION OF THE INVENTION

Figure 1:
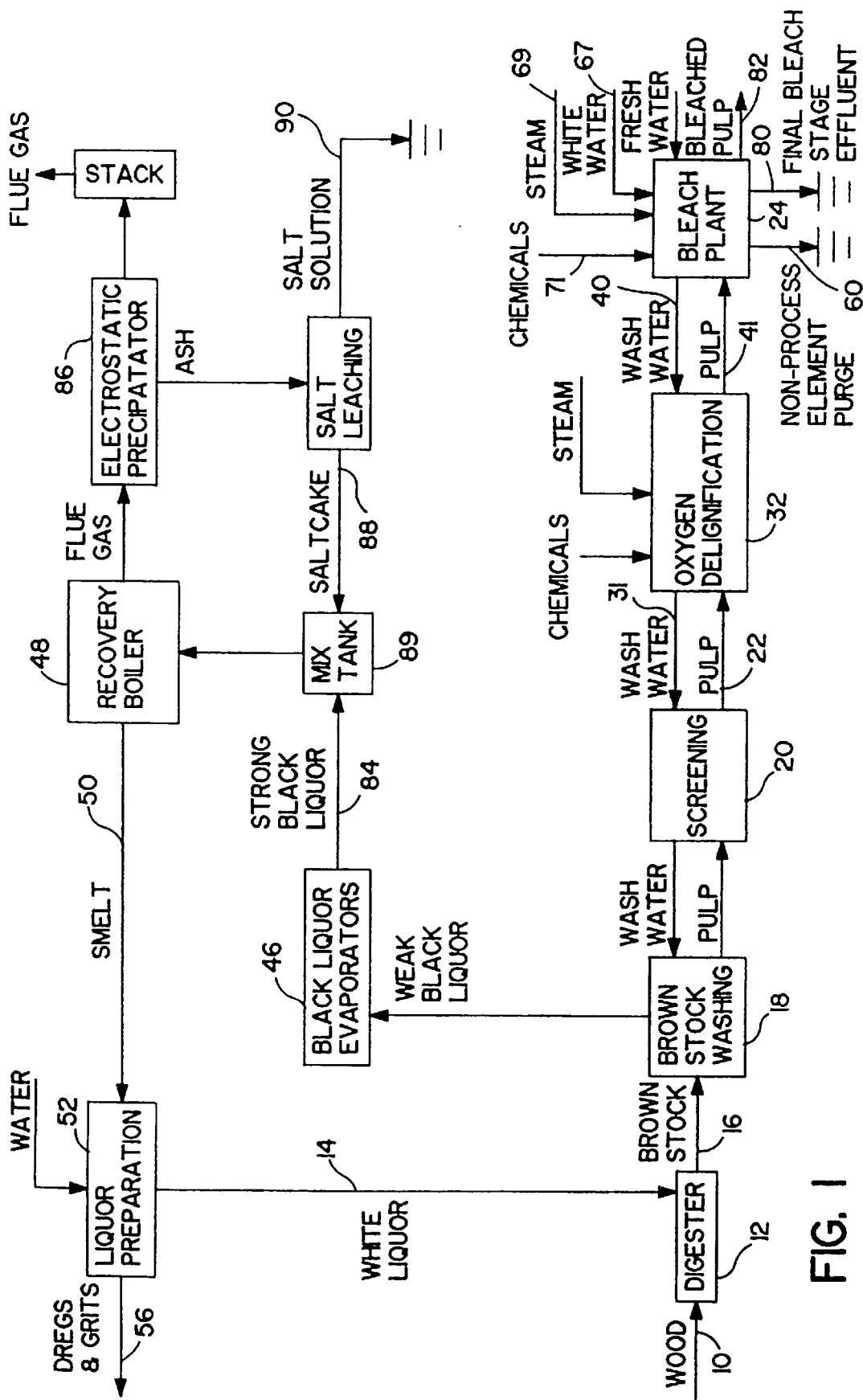
FIG. 1 is a schematic illustration of the overall pulp making and chemical recovery processes in accordance with the present invention.

The process of the present invention overcomes one or more of the previously encountered problems in recycle of bleach plant filtrates employing a combination of various means. One essential feature of the present invention for overcoming these difficulties is to also use pulp in the first acidic bleaching stage having a Kappa number equal to or less than about 30, preferably equal to or less than about 25, more preferably from about 5 to about 20, and most preferably from about 6 to about 15 for hardwood pulp and from about 8 to about 18 for softwood pulp. Pulp having the desired Kappa number can be obtained from any convenient source or by any convenient means known to those of ordinary skill in the art. For example, the pulp can be obtained through use of modified continuous cooking (MCC), extended modified continuous cooking (EMCC), rapid displacement heating (RDH), super batch, anthraquinone, polysulfide, enzymes, high heat washing, oxygen delignification and the like, and combinations thereof. In the preferred embodiments of the invention suitable pulp is obtained by treating the pulp after brown stock washing and before the first acidic bleaching stage in an oxygen delignification stage in the presence of oxygen and preferably in the presence of base and preferably followed by at least one washing stage after oxygen delignification.

Another essential feature of the present process is bleaching the pulp having an appropriate Kappa number sequentially in a first acidic bleaching stage and a first alkaline bleaching stage, and the recovery of the filtrates from the first acidic bleaching stage and the first alkaline bleaching stage and the countercurrent recycle of these filtrates to the weak black liquor and into the recovery system. All or a portion of these filtrates may be recycled. In a preferred embodiment of the invention, only a portion of these filtrates are recycled. For example, preferably a portion of the filtrates for these bleaching stages usually from a washer a decker or a combination thereof is recycled to the weak black liquor and the other portion is recycled to the bleaching stage, to the washer or decker or to a combination thereof to maintain water balance. Preferably from about 1 to about 50%, more preferably from about 5 to about 25% and most preferably from about 10 to about 20% of the filtrates are recycled to the weak black liquor, preferably as a combined filtrate. In the preferred embodiments of the invention, these filtrates are preferably recycled as wash water through at least one (preferably all) post oxygen delignification washing stages if such stages are present, brown stock washing stages or a combination thereof (preferably sequentially) and into the recovery stages as will be described in more detail below. In the preferred embodiments of this invention where the desired goal is to reduce effluent to the greatest possible extent filtrates from as many subsequent bleaching stages as possible are recovered, preferably all or substantially all of such filtrates and conveyed to the weak black liquor. Recovery of bleach plant filtrates can be accomplished for example by replacing the wash water used on at least one post alkaline bleaching washing stage with filtrate from a washing stage of one or more subsequent, preferably the next subsequent, additional bleaching stages such that wash water used on all or a portion of the washers of all bleaching stages except the final washer of the last bleaching stage is the filtrate from subsequent, preferably the next subsequent, bleaching stage. In the preferred embodiments of the invention, subsequent washing and bleach stage filtrates would be counter-currently recycled through all washing stages of all additional bleaching stages as for example by recycling the filtrate from the first washing stage of a subsequent bleaching stage to the last washing stage of the preceding bleaching stage.

The bleaching agents employed in the bleaching sequence may vary widely provided that at least one stage is an acidic bleaching stage and at least one alkaline bleaching stage after the at least one acidic bleaching stage. Active bleaching agents used in the first acidic bleaching stage or any additional acidic bleaching stages may vary widely and any conventional bleaching agent operable under acidic conditions (pH less than 7, preferably equal to or less than about 6, more preferably equal to or less than about 5 and most preferably from about 1 to about 5) may be used. For example, useful agents include ozone, elemental chlorine, chlorine dioxide, peracids such as peroxymono sulfuric acid and peroxyacetic acid, dimethyl dioxirane or mixtures thereof. In the preferred embodiments of the invention, the bleaching agent in any one acidic bleaching stage or the total bleaching agent used in all acidic bleaching stages of the bleaching sequence, the amount of active elemental chlorine bleaching agent is less than about 30%, preferably less than about 20%, more preferably less than about 10%, and most preferably less than about 5% active elemental chlorine. In the embodiments of choice there is no or substantially no elemental chlorine employed in the acidic bleaching stages. By limiting the amount of elemental chlorine used in the bleach plant, which limits the chloride introduced into the pulping liquor cycle, and avoiding the cyclic flow of chloride contained in the boiler ash, the chloride concentration in the pulping liquor cycle and feed to the recovery boiler is controlled. In the more preferred embodiments of the invention, the bleaching agent employed in the first acidic bleaching stage is ozone or chlorine dioxide, more preferably chlorine dioxide, in which the amount of elemental chlorine can vary as described above. In the most preferred embodiments of the invention, the ozone or chlorine dioxide bleaching agent includes no or substantially no elemental chlorine. As shown in FIG. 1, it has been discovered that by reducing the amount of elemental chlorine in the bleaching agent employed in the first acidic bleaching stage that the increase in consumption of bleaching chemicals, if any, is much less than expected. Accordingly, the amount of elemental chlorine is minimized (less than about 5% to about 10%) and in the embodiments of choice no or substantially no elemental chlorine is used (less than about 1%). Bleach chemical consumption due to carryover of dissolved organic matter in the recycled combined filtrates from the first acidic and alkaline bleaching stages to the first acidic bleach stage is reduced by reducing the amount of elemental chlorine, preferably by complete substitution of chlorine dioxide for chlorine in the first acidic stage.

Similarly, the bleaching agent employed in the first alkaline bleaching stage or any additional alkaline bleaching stages may vary widely and any conventional agent the is operable under alkaline conditions (pH at some point during said bleaching stage is greater than 7, preferably equal to or greater than about 8.2, more preferably equal to or greater than about 9 and most preferably from about 9 to about 12) can be used. Illustrative of useful agents are hydrogen peroxide, oxygen in the presence of base, sodium hypochlorite or a combination thereof. The alkaline bleaching stage is preferably oxidative extraction with oxygen in the presence of base, preferably in the presence of hydrogen peroxide, which contributes to a relatively low bleach chemical consumption in the first acidic stage of bleaching due to dissolved organic matter in the combined filtrates from the acidic and alkaline bleaching stages because of the highly oxidized nature of the organic matter having been exposed to oxygen and/or peroxide in the extraction stage. This means that for a given extracted kappa number, carryover of organic matter from the combined recycled filtrate from the alkaline and acidic bleaching stages of the present process into the first acidic bleaching stage will not increase bleach chemical consumption unduly.

The types of bleaching sequences and the number and type of bleaching stages comprising the sequences may vary widely, provided that the essential first acidic and alkaline bleaching stages are present. In the preferred embodiments of this invention described in this application the invention is described more particularly with respect to the D(EOP)D sequence wherein D represents bleaching with chlorine dioxide which contains no or substantially no elemental chlorine and more preferably no elemental chlorine and (EOP) represents oxidative extraction in the presence of base preferably sodium hydroxide and an effective amount of peroxide. Other possible sequences include: D(EOP)DD, D(EOP)(DD), D(EOP)(DED), DEDED, DEHD, ZED, EDED, EHDED, DEHED, DEDH/ED, DHED, ZEZ, DH/ED, DEDEDP, DEZP, Z(EOP), DEZ, ZEPP, DEZD, D(EOP)DO, D(EOP)(DED), D(EOP)D, D(EOP)DP, Z(EOP)D, Z(EOP)DP, Z(EOP)ZD, Z(EOP)PP, D(EOP)PP, and the like in which D is as described above and Z is ozone, E is extraction in the presence of base, O is oxygen and P is peroxide.

Another essential requirement of the process of this invention is the collection of chlorides, as for example chlorides generated in the acidic bleaching stage(s), chlorides introduced into the bleaching process with the wood fiber or combination thereof, in the filtrates from the first acidic and alkaline bleaching stages, the countercurrent recycle of these filtrates to the weak black liquor, preferably as wash water through at least one post oxygen delignification washing stage (if oxygen delignification is used) and through one or more brown stock washing to the weak black liquor and the recovery system where the chlorides are removed. Several advantages flow from removal of the chlorides in the recovery system. For example, chlorides accumulate in the recovery system in a relatively concentrated solid form, and therefore are easier to remove than from the circulating filtrates and other liquors in the bleaching process to maintain the concentration of chlorides in the filtrates and other liquors at the desired level. Enrichment or concentration of chlorides in the ash also reduces the amount of raw materials and resources required to separate chlorides from the ash as compared to separating chlorides from a liquid as for example the white liquor. Moreover, removal of chlorides from the ash as compared to removal of chlorides from filtrates and liquors in the process avoids or reduces the cycle flow of chlorides, thereby reducing the amount of chlorides feeding the recovery boiler and reducing or avoiding problems associated with conventional systems as for example pluggage, corrosion, organo chlorides in boiler air emissions and the like. In the recovery system, the black liquor (which contains chlorides and which is formed from evaporation of the weak black liquor which in turn is formed from the filtrate from brown stock washing) is combusted in a boiler forming an ash and a smelt. The smelt is recycled to generate the pulping liquor. Sodium chloride has a significant vapor pressure at the operating temperatures of the boiler and as such chlorides feed the boiler, they are preferentially distributed in the boiler ash. Ash, when mixed in the black liquor and fed to the boiler, creates a significant cyclic flow of chlorides, which adversely affects the system. The subject process avoids or reduces this cyclic flow of chlorides by removing chlorides from the ash before it is re-introduced to the boiler. The process also provides significant benefit in the removal of potassium from the liquor cycle. The removal of chloride and potassium provides significant benefit to the recovery boiler operation. By removal of chlorides, chloride concentrations in the circulating liquors is therefor maintained and/or reduced to desired levels. Desired chloride concentration levels may vary widely depending on the nature of the mill, recovery boiler, evaporation system and the like. For example, desired chloride concentration levels can be as high as from 50 to 100 g of chloride per liter of white liquor in "coastal mills" i.e., pulping mills where the wood supply is transported by sea water and as low as 5 g of chlorides per liter of white liquor in "inland mills" i.e. pulping mills where the wood supply is not transported via sea water. The process is especially useful in inland mills and desired chloride levels are maintained at levels desired for such mills. Such chloride concentration levels are preferably equal to or less than about 20 g/l, more preferably equal to or less than about 15 g/l, most preferably equal to or less than about 10 g/l.

Typical chloride concentrations in white liquor and feed to the recovery boiler are contrasted in the following Table 1 for four mills:

TABLE 1

COMPARISON OF TYPICAL CHLORIDE CONCENTRATIONS FOR VARIOUS MILLS

|  | INLAND MILL | COASTAL MILL | THUNDER BAY MILL | PRESENT INVENTION |
|---|---|---|---|---|
| NaCl in White liquor, grams NaCl/liter | 3.6 | 25–50 | 50 | 4.5 |

TABLE 1-continued

COMPARISON OF TYPICAL CHLORIDE CONCENTRATIONS FOR VARIOUS MILLS

|  | INLAND MILL | COASTAL MILL | THUNDER BAY MILL | PRESENT INVENTION |
|---|---|---|---|---|
| NaCl to Recovery Boiler, % of B.L. Solids | 0.2–0.5 | 6.1 | 6.0 | 0.45 |
| NaCl to Recovery process, pounds NaCl per ton pulp | 1–3 | 11–36 | 115 | 10–12 |

Results from the Thunder Bay mill are reported literature values when that mill operated with the closed mill concept. The results for mills operating according to the present invention are calculated for an "inland mill" operating with the bleach filtrate recovery process shown in FIG. 1 and FIG. 2. As shown in Table 1 in this embodiment of the process of the present invention, the chloride input to the liquor recovery operation is reduced by about 90% over that described by Reeve et al in U.S. Pat. No. 4,039,372.

The removed chlorides can be discharged from the process and disposed of by some suitable means as for example by discharge to the sewer, discharge to a holding/evaporation pond, and the like. The chlorides can also be treated to recover the chloride values employing any conventional procedure. For example, the chlorides, which may contain potassium salt contaminants, can be purified by some suitable conventional procedure such as ion exchange, evaporative recrystallization and the like, then subjected to electrochemical oxidation to form chlorate which is then chemically reduced to form chlorine dioxide which can be used as the bleaching agent in the acidic bleaching stage(s). The chlorides can also be used to regenerate ion exchange resin when ion exchange is used for metals removal. Such processes which may be used in the practice of the invention are conventional and will not be described in great detail.

Another essential component of the present invention is the removal of all or a portion of the non-process metals which enter the process with the wood fiber such as calcium, magnesium and manganese from the filtrates. The overall amount of metals removed may vary widely. Preferably at least about 50%, more preferably at least about 70% of the metals are removed based on the amount of non-process metals in the pulp entering the acidic bleaching stage. This enhances the recyclability of the filtrates especially when the filtrates are recycled as wash water in the alkaline bleaching stage(s) or in the acidic bleaching washing stage immediately preceding the alkaline bleaching stage because of the tendency of non-process metals to associate with pulp fibers under alkaline conditions. This association adversely affects the pulp manufacturing process as, for example, adversely affecting the bleaching process and pulp quality e.g., increased bleach chemical consumption, reduced brightness, brightness reversion and scaling and the like.

Any method capable of removing non-process metals from filtrates can be used. In one preferred embodiment of the invention, the metals removal procedure relies on the disassociation of the non-process metals from wood fibers in aqueous acidic medium i.e., pH less than about 7, preferably equal to or less than about 6, more preferably equal to or less than about 5 and most preferably from about 1 to about 5. In this embodiment of the invention, pulp is treated under aqueous acidic conditions at some point during the process, preferably during, before or after the first acidic bleaching stage and before the first alkaline bleaching stage to remove all or a portion of non-process metals. Any procedures known to those of skill in the art can be employed which takes advantage of this disassociation characteristic of the non-process metals.

In one preferred embodiment of the present process the filtrate from the first acidic bleaching stage contains dissociated non-process metals. All or a portion of this filtrate can be discharged from the process as for example to the sewer. Alternatively, all or a portion of the filtrate can be treated to remove all or a portion of the non-process metals and all or a portion of the treated filtrate can be recycled to the process as for example as wash water in one or more of the washing stages, as water to dilute pulp at any suitable point in the process or the like. The untreated filtrate may also be recycled to another point in the process, preferably a point before the first alkaline bleaching stage. For example, all or a portion of the untreated filtrate can be recycled as wash water to the post oxygen delignification washing stage, brown stock washing stage or a combination thereof or recycled to some point prior to the first acidic bleaching stage to dilute relatively high consistency pulp prior to that stage.

Figure 2:
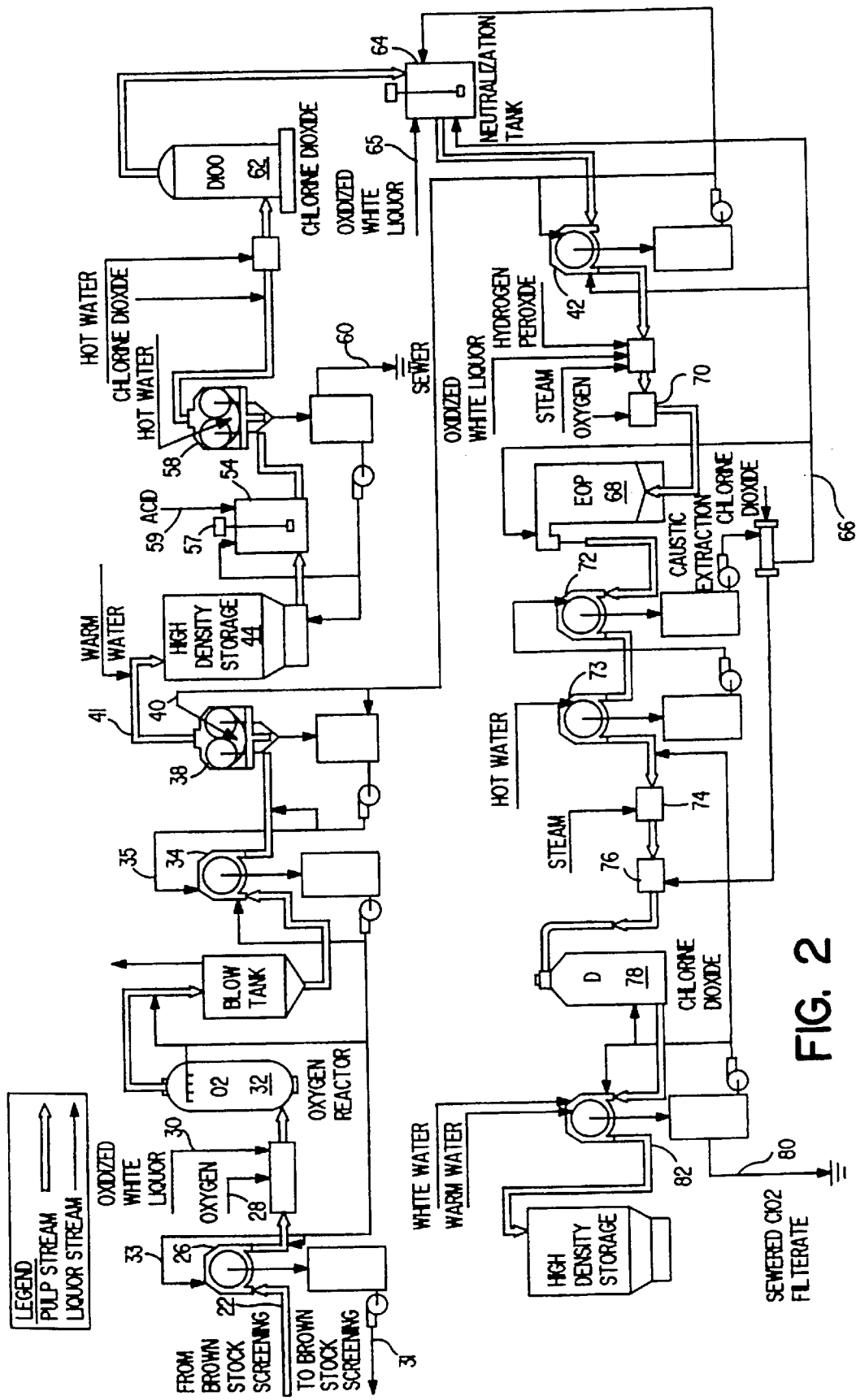
FIG. 2 is a schematic illustration of the bleach plant operation including the filtrate recycling process of the present invention.
Figure 3:
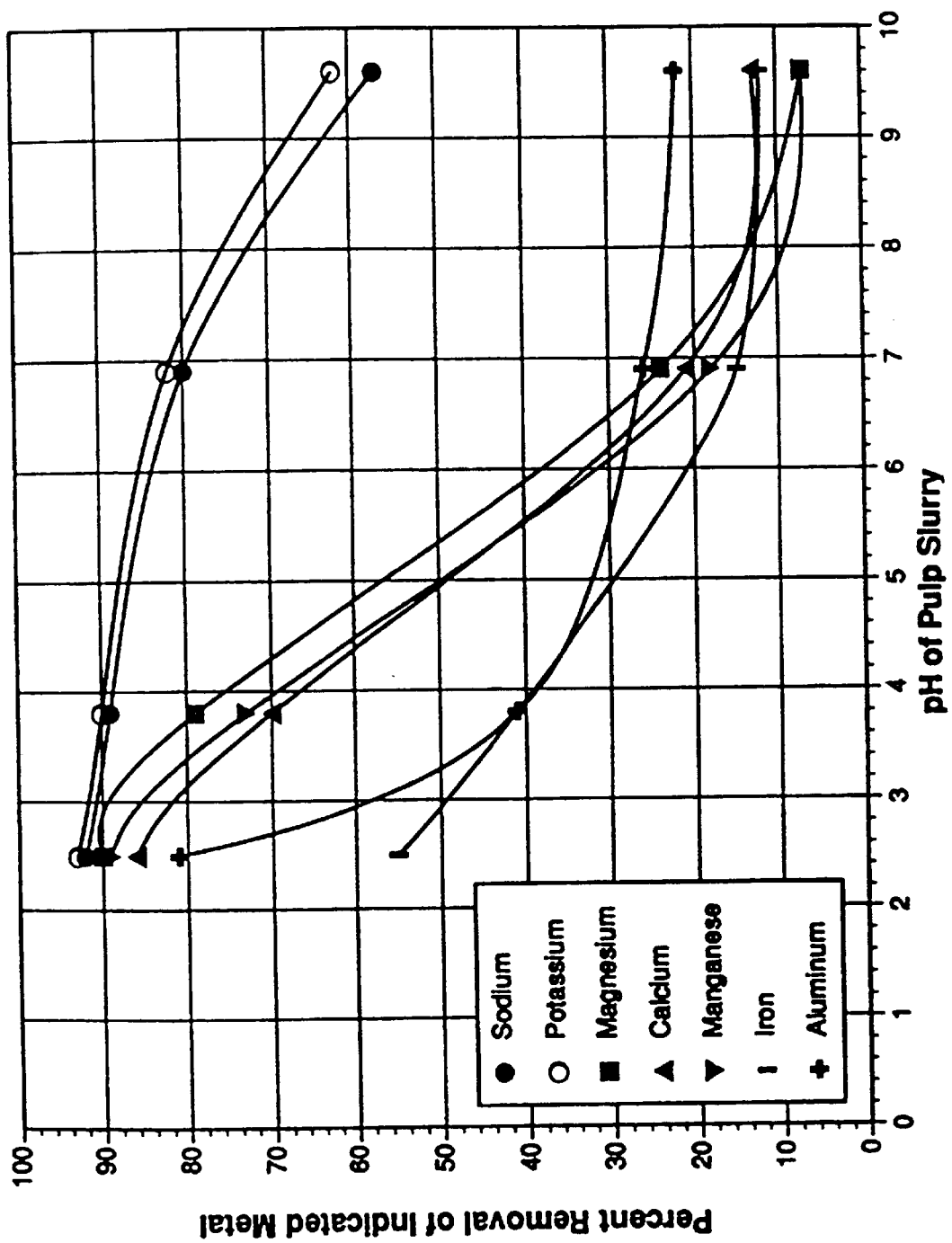
FIGS. 3 and 4 depict, in graphic form, the percent removal of various metals from hardwood and softwood pulps as a function of the pH in the acid treatment stage.
Figure 4:
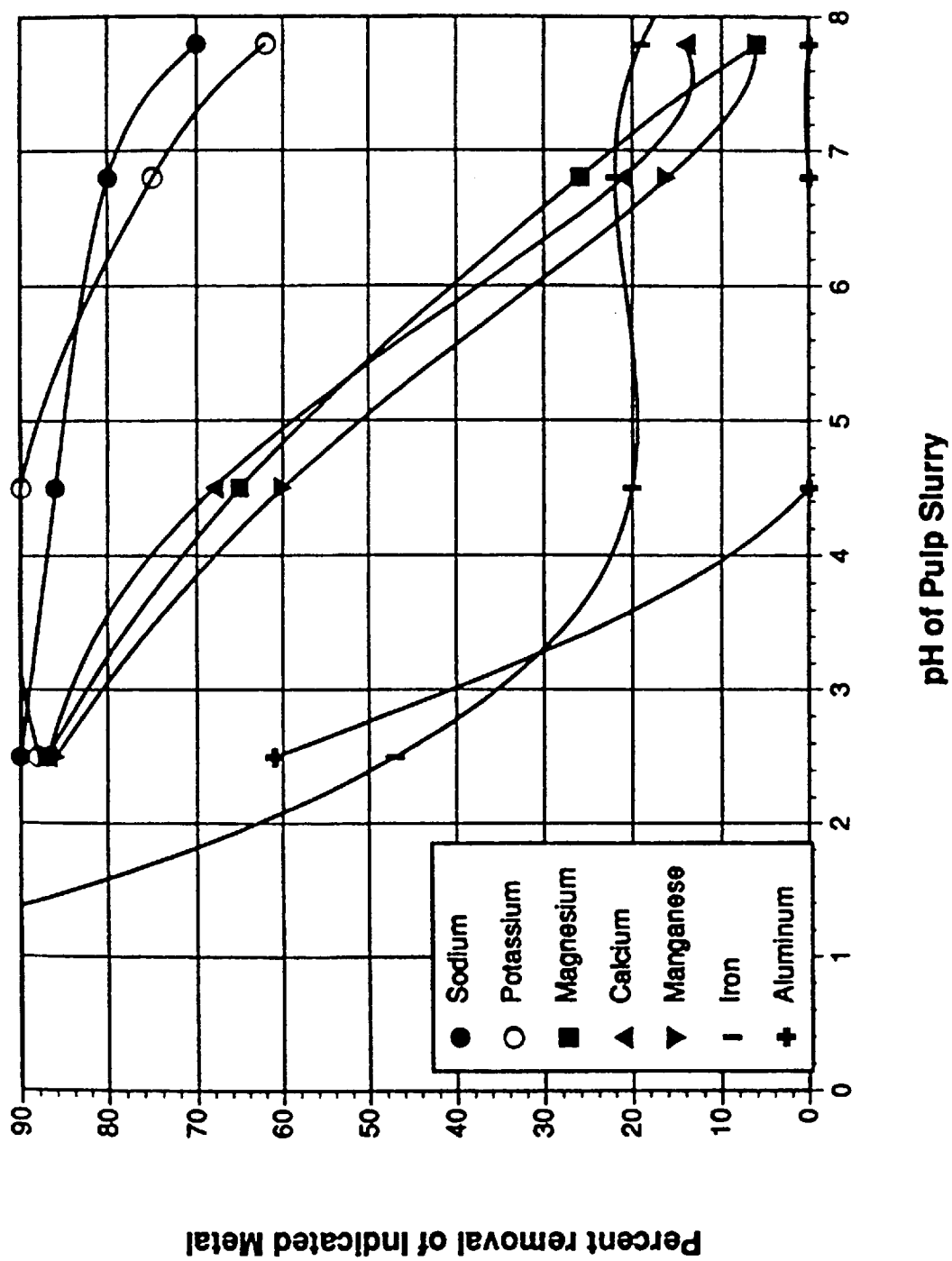

Another preferred embodiment of the invention uses an acid treatment step prior to the first acidic bleaching stage to remove non-process metals as illustrated in FIG. 2. The acidic wash filtrate can be disposed of or used employing any conventional procedure. For example, all or a portion of the filtrate can be discharged from the process, as for example to the sewer. Alternatively, all or a portion of the filtrate can be treated to remove all or a portion of the dissolved non-process metals employing conventional procedures, as for example ion exchange, precipitation by treatment with base to raise the pH to a value greater than seven and the separation of solid and aqueous phases and the like and all or a portion of the treated filtrate can be recycled to the process as for example as wash water in one or more of the washing stages, as water to dilute pulp on any suitable point in the process or the like. The untreated filtrate may also be recycled to another point in the process, preferably a point before the first alkaline bleaching stage. For example, all or a portion of the untreated filtrate can be recycled as wash water to the post oxygen delignification washing stage, brown stock washing stage or a combination thereof or recycled to some point prior to the first acidic bleaching stage to dilute relatively high consistency pulp prior to that stage.

In the preferred embodiment of the invention which includes oxygen delignification, the location of the acid treatment stage after oxygen delignification and post oxygen washing is critical in enhancing the recovery of spent chemicals and dissolved organic matter from the wood pulp. This improved recovery is illustrated in the following Table 2:

TABLE 2

COMPARISON OF SEWER DISCHARGE FROM ACID TREATMENT OF SOFTWOOD PULP BEFORE AND AFTER OXYGEN DELIGNIFICATION

| BEFORE OXYGEN DELIGNIFICATION | | | | AFTER OXYGEN DELIGNIFICATION | | | |
|---|---|---|---|---|---|---|---|
| | | TO SEWER | | | | TO SEWER | |
| $H_2\%SO_4$ | $_pH$ | TOC #/T | Color #/T | $H_2\%SO_4$ | $_pH$ | TOC #/T | Color #/T |
| 9.1 | 2.1 | 41.2 | 48.8 | 2.0 | 2.3 | 0.9 | 2.0 |

Table 2 shows how sewer losses vary if the acid treatment process is located before oxygen delignification versus after oxygen delignification. Percent metal removal is the same regardless of location. As shown in Table 2, nearly 25 times as much color and 40 times as much total organic carbon (TOC) is lost to the sewer if the acid treatment is placed before oxygen delignification rather than after oxygen delignification. At high chlorine dioxide substitution the entire softwood bleach plant discharges about 50 to 60 #/T color. Placement of acid treatment before oxygen delignification would nearly negate the environmental benefit of recovering bleach filtrates.

In the preferred embodiments of the invention, the overall objection of non-process metals removal is to achieve a lower non-process metal concentration in the washed pulp entering the first alkaline bleaching stage, relative to what is present in the pulp entering the first acidic bleaching stage. The extent of non-process metals removal is preferably as set forth in the following Table 3.

TABLE 3

| | Approximate Percent (%) Metal Remaining in Washed Acidic Stage Pulp ("168") Relative to Pulp Entering Acidic Stage ("122") | | |
|---|---|---|---|
| Bleach Stages Present in Overall Bleach Sequence | Ca | Mg | Mn |
| No P Stage(s), No Z Stage(s) | 10–50% | 10–50% | 10–30% |
| P Stage(s) and/or Z Stage(s) | 10–50% | 10–50% | 1–5% | where "P" is peroxide and "Z" is ozone.

There are two primary variables with which to achieve the desired degree of non-process metals removal. The first of the two variables is the volume of acidic filtrate that is "treated" in the metals removal process. This is referred to as the "volume treated". The requirement for the "volume treated" can vary considerably with each specific mill, but is typically of the order of about 10% to about 40% of the volume of total acidic filtrate. The second of the two variables is the efficiency of the metals removal process at removing non-process metals from solution. This is referred to as the "treatment efficiency". The "treatment efficiency" should be at least about 50%, preferably about 50% to about 75%, more preferably about 75% to about 90%, and most preferably greater than about 90%.

Any conventional process for removing dissolved metals from an aqueous solution can be used. In one preferred embodiment as, for example, the embodiment depicted in FIG. 7, non-process metals can be removed by a process which precipitates non-process metals as for example as carbonates and hydroxides. In this metal precipitation embodiment, all or a portion of the first acidic filtrate from the first acidic bleaching stage or from the acid wash is treated with base such as sodium hydroxide and/or sodium carbonate, or green liquor from the pulping process, sufficient to raise the pH above 7, preferably to between about 9 and 11, to provide an amount of carbonate ion such that insoluble non-process metal precipitates as, for example, carbonates and hydroxides will be formed. The aqueous solution is maintained for sufficient time and at a sufficient temperature as for example for at least about 10 minutes and at a temperature of up to about 160° F. such that insoluble non-process metal compounds such as carbonates and hydroxides precipitate from the aqueous solution. A suitable separation device, preferably a precoat filter or a clarifier, is used to separate the aqueous phase from the solid precipitate. The solid precipitate can then be disposed of by landfill or introduced into the pulping liquor cycle either with heavy black liquor before combustion in the recovery boiler or with green liquor. If the precipitate is introduced into the pulping cycle, the non-process metals will be removed from the mill along with other non-process metals in the current practice of grits and dregs removal.

In another preferred embodiment of this invention, all or a portion of the non-process metals can be removed by treating the acidic filtrate from the acidic wash or from the first acidic bleaching stage with an ion exchange resin where the dissolved non-process metals are removed by the resin to provide a filtrate containing a reduced amount of dissolved non-process metals. For example, in one preferred embodiment of this invention, as for example the embodiment depicted in FIG. 8, all or a portion of the non-process metals can be removed by passing all or some of the acidic bleach filtrate or acidic wash filtrate through an ion exchange system containing a cation exchange resin as, for example, the system available from Advanced Separation Technologies, Inc. under the Tradename "ISEP" and the system from Eco-Tec, Inc. and/or PROSEP Technologies, Inc., under the Tradename "RecoFlo", such that the dissolved non-process metals in the acidic bleach or acidic wash filtrate are preferentially removed from the filtrate relative to other metals. Prior to passage through the ion exchange resin the filtrate can be treated to remove suspended solids by conventional means such as by dissolved air flotation, filtration, sedimentation, precoat, centrifugation and the like. In the preferred ion exchange system, the cation exchange resin in the ion exchange process removes non-process metals until its capacity to continue to do so is exhausted. At such time the cation exchange resin can be "regenerated" with regenerant which serves to remove the non-process metals and produce a highly concentrated waste regenerant containing the non-process metals. Sources of regenerant include sodium chloride, and/or by-product sesquisulfate or sodium sulfate produced during the manufacture of chlorine dioxide, and/or sodium chloride solution removed in the recovery system.

The waste regenerant can subsequently be discharged from the process so as to satisfy the need for purging the non-process metals, without taking away from any of the benefit achieved by the process. Alternatively, the waste regenerant can be treated with a base, such as sodium hydroxide and/or sodium carbonate, sufficient to raise the pH to provide an amount of carbonate ion such that insoluble metal carbonates and hydroxides will be formed. Insoluble carbonates and hydroxides of calcium, magnesium, manganese and iron precipitate from solution upon treatment with sodium hydroxide and/or sodium carbonate. The precipitate can be separated from the regenerant using any conventional means for separating as precipitated solid from a liquid phase such as precoat filter or a clarifier. The solid precipitate can then be disposed of in some suitable fashion or, for example, it can be combined with the green liquor dregs for disposal, returned to Kraft recovering into the pulping liquor cycle, or disposed of on its own to a landfill. The aqueous stream produced by separation of the metal precipitate is suitable to be re-used in the process as for example for regenerating the exhausted cation exchange resin or it can be discharged from the process.

The aqueous phase from the metal removal system containing reduced concentrations of non-process metals is then preferably reused at some point in the pulp manufacturing process. This aqueous phase contains a reduced amount of metals and is preferably relatively free of non-process metals and can be used for example in the first acidic bleach stage washer to displace entrained liquor containing metals. This method of washing pulp with filtrate from which all or a portion of the metals have been removed reduces the quantity of metals carried into the first alkaline bleaching stage without the use of fresh water. Use of filtrate from the metal removal system is not limited to washing after the first acidic bleach stage. It can also be used for pulp dilution prior to the high density storage or for washing pulp prior to acidic bleaching.

The following examples are presented to describe the invention in greater detail but should not be construed as limitations thereto.

EXAMPLE I

Referring to FIG. 1, Southern Pine Softwood (hardwood) Chips 10 are screened (not shown) to remove oversized and undersized chips, then cooked in a digester 12 using the Kraft pulping process with a white liquor 14 charge of from about 15 to 22%, and preferably 18%, active alkali and about 20 to 40%, preferably about 30%, sulfidity under cooking conditions of about 310° to about 350° F., and preferably about 344° F., and from about 80 psi to about 140 psi, and preferably about 110 psi.

The resulting pulp having a Kappa number ranging from about 25 to about 35, and preferably about 30, is discharged under pressure into a blow tank (not shown), then screened to remove uncooked knots (not shown). After removal of knots, the brown stock 16 is washed successively with from two to four stages, and preferably three stages of washing. After washing, pulp is screened 20 to remove rejects and the resulting pulp 22 is then charged to the oxygen delignification stage 32.

As best shown in FIG. 2, the pulp, after brown stock washing and screening, is shown entering the last wash stage 26 prior to entering the oxygen delignification stage 32, wherein it is admixed with oxygen 28 and oxidized white liquor 30 and then further delignified in an oxygen delignification stage 32 to a Kappa number ranging from about 14 to about 20, and preferably about 16, corresponding to about 30 to about 55%, and preferably about 45%, delignification. The oxygen delignification stage 32 is run under typical conditions of temperature and pressure with alkali as, for example, alkali supplied in the form of the oxidized white liquor 30.

Following oxygen delignification, the pulp is again washed successively with from 2 to 4 stages of washing (shown as 34 and 38) to remove the lignin and inorganic materials. The wash water 35 is derived from the washings from the next subsequent wash stage 38. The final wash is derived from filtrate 40 obtained from the decker 42 after the first bleach stage as described hereinbelow. The resulting washed pulp is then stored in a high density (10–12%) storage vessel 44.

The filtrates from the post oxygen delignification washers, 34 and 38, are recycled back counter currently as wash water through the pre-oxygen delignification washer 26 as best seen in FIG. 2. All of the organic and inorganic materials are eventually concentrated through a train of black liquor evaporators 46 and sent to the recovery boiler 48 for combustion, as shown in FIG. 1.

As best seen in FIG. 1, the inorganic salts, recovered as smelt 50, are dissolved in water to form green liquor in liquid preparations 52, which in turn is treated with calcium oxide to regenerate the white liquor 14 fed to the digester 12. The calcium carbonate by product is burned in a kiln (not shown) expelling carbon dioxide and regenerating calcium oxide which is used to regenerate the white liquor.

Throughout the pulping (including oxygen delignification), washing and recovery processes, no organic or inorganic materials are intentionally discharged and/or disposed of, with the exception of the small amount of dregs that settle out in the green liquor clarifier and grits from the green liquor shaker (not shown).

Returning now to FIG. 2, the pulp from high density storage 44 is then subjected to an acidification treatment in tank 54 equipped with mixer 57. The pulp can be treated with acid to a desired pH as, for example, a pH within the range of from about 2 to about 3, entering tank 54 through a line 59. The primary function of the acidification treatment is to solubilize the non process metals that come in with the wood supply and which must be purged from the process. In the past, this typically was done in the first acidic bleaching stage where the filtrate was discharged to the sewer. By adding an acidic stage with no ability to delignify, the metals can be removed and thereby allow the first acidic bleaching stage with its content of solids (color, BOD, etc.,) to be recovered. By acid treating the pulp from the high density storage not only are the metals removed but most of the dissolved organics associated with the pulp slurry will be precipitated onto the fibers and will be carried into the first bleaching stage rather than discharged with the metals to the sewer. This is preferred to significantly reduce the discharge of dissolved organics. Accordingly, it can be seen that the acidification treatment step prevents the build-up of metals within the brownstock washing/bleach plant cycle which would otherwise limit the viability of the process.

After acidification, the pulp is washed in washer 58 with fresh water to remove the acidic wash and the non-process metals. This wash, which is low in environmental impact since no bleaching or delignification is effected, is discharged to the sewer at 60.

After the acid treatment and wash, chlorine dioxide or a mixture of chlorine dioxide and chlorine is added to the pulp at an application rate of about 2.0 to 3.4%, preferably about 2.6%, calculated as active chlorine. The pulp is treated with the chlorine dioxide or a mixture of chlorine dioxide and chlorine solution in the first bleaching stage 62 under conditions of 10–12% consistency, a reaction time ranging from about 30 to about 90 minutes, preferably about 60 minutes, and a temperature ranging from about 100 to about 160° F., preferably about 140° F. Although chlorine can be added along with the chlorine dioxide in the first bleaching stage, it is considered important in achieving a bleaching stage with minimal chloride residuals to limit the use of chlorine to less than about 10%, or completely eliminate the use of molecular chlorine.

After the first acidic bleaching stage, the pulp is then discharged into a mixing tank 64 for partial neutralization to a pH ranging from about 5 to about 7, and preferably to about 7, using the alkaline filtrate 66 from the first oxidative extraction stage 68 with some caustic make-up in the form of oxidized white liquor 65, generally less than 1% on pulp. The pulp is then thickened by passage over decker 42 and oxidized white liquor is added at an application rate of about 1 to about 2%. Hydrogen peroxide is then introduced to the stream from the decker and oxygen is added to the pulp through high intensity mixer 70. Additional delignification is thus accomplished in oxidative extraction stage 68 thereby producing a pulp with a Kappa number ranging from about 2 to about 6, and preferably about 4. The pulp is then diluted at the oxidative extraction tower discharge using a portion of the filtrate 66 from the first post extraction stage washer 72. Following the oxidative extraction stage 68, the pulp is washed successively on at least one post-extraction stage washer and preferably on two washers 72 and 73 as depicted in the drawings. The pulp is then heated by steam in a steam mixer 74 and chlorine dioxide is added in a high intensity mixer 76 and allowed to react in the chlorine dioxide bleaching tower 78 at a temperature ranging from about 150° to about 180° F., and preferably about 160° F., for from about two to about four hours, and preferably for about three hours.

The bleached pulp is then washed using paper machine white water with a portion of the filtrate being sewered at 80 and not recovered within the process. The remaining portion of the filtrate can be recycled to the chlorine dioxide bleaching tower 78 for pulp dilution. Thus, from the bleach plant 24, the only intentional discharges are flows from the acid pretreatment stage at 60 and from the final wash applied to the fully bleached pulp at 80.

Filtrate, from washing pulp exiting the oxidative extraction stage 68, is used, in part, for discharge dilution of the pulp from the oxidative extraction tower 68 by way of line 66, and in part, is used for neutralization of the pulp exiting the first bleaching stage 62 in neutralization stage 64. Addition of fresh water to wash the pulp after the extraction stage is reduced by using two stages of washing and as such is preferred to reduce, if not eliminate, additional evaporator requirements. Thus two stages of washing after the oxidative extraction stage is an important element to the viability of this process.

As shown in FIG. 2, filtrate 40 is produced when decker 42 thickens the pulp received from the neutralization stage 64. Filtrate 40, which is a combination of filtrate from the first chlorine dioxide stage and extraction stage, is used as wash water in the last post-oxygen delignification washer 38. The filtrate 35 from the last post oxygen delignification washer 38 is, as discussed, hereinabove, recycled counter-current to pulp 71 through washers 34 and 26 via lines 35 and 33. As shown in FIG. 1, filtrate 31 from washer 26 flows counter-current to pulp through screening 20 and brown stock washing 18. In this way, chlorides, spent bleaching chemicals and organic matter removed during bleaching are combined with spent pulping liquor and evaporated producing strong black liquor 84.

Chloride from the bleach plant, contained in black liquor 84 feeding the recovery boiler 48, is partially volatilized in the recovery boiler and carried to the electrostatic precipitator 86 where it is collected and removed with salt cake in the precipitator ash. This ash is dissolved with water in the salt leaching process at a temperature ranging from about 80° to about 120° F., and preferably about 100° F., to separate out sodium sulfate from sodium chloride. The aqueous sodium chloride solution is sewered at 90 and the solid sodium sulfate 88, with some residual chloride is recycled back to the mix tank 89. The leaching process prevents the build up of chloride concentration in the liquor cycle and maintains the concentration of sodium chloride in the white liquor at less than 5 grams per liter. The leaching process as described herein operates at greater than 95% efficiency in terms of salt cake recovery.

EXAMPLE II

A series of experiments were carried out to evaluate the effect of using different bleaching agents in the first acidic bleaching stage and the first alkaline bleaching stage and the effect of countercurrently recycling the combined filtrates from these bleaching stages to the first acidic bleaching stage. Effects studied were bleach consumption, and color, AOX and BOD in the bleach plant effluent. The results are set forth in the following Tables 4 and 5.

TABLE 4

EFFECT ON CHLORINATION AND EXTRACTED KAPPA NUMBERS WHEN ORGANIC MATTER IS ADDED TO THE CHLORINATION STATE (Combined Filtrate (D100 + EO) From Bleach Filtrate Recovery Added To First D Stage Of OD (EO)D Sequence)

| Added organic Matter % TOC On Pulp | D100 Kappa | Extracted Kappa |
| --- | --- | --- |
| 0 | 6.3 | 4.1 |
| 0.145 | 6.6 | 4.0 |
| 0.29 | 7.0 | 4.3 |
| 0.44 | 7.1 | 4.2 |

TABLE 5

BLEACH PLANT EFFLUENT CHARACTERISTICS

| BLEACH SEQUENCE | COLOR | AOX | $BOD_5$ |
| --- | --- | --- | --- |
| O(C + $D_{10}$) (EO)D | 120 | 8 | 30 |
| O($D_{50/c}$) (EO)D | 90 | 4 | 25 |
| OD(EO)D | 50 | 2 | 20 |
| Recycle OD(EO)D | 10 | 1 | 10 |
| OD(EO)D | 1 | 0.1 | 2 |

All values in lbs/ton

The data show that the process significantly reduces the color, AOX and BOD in the bleach plant effluent as shown in Table 5 wherein the effects of chlorine dioxide substitution for molecular chlorine and the effect of the filtrate recycle in accordance with the present invention are shown. The data also shows that the use of chlorine dioxide and extraction in the presence of oxygen and peroxide results in more lower consumption of bleaching chemicals than was expected.

EXAMPLE III

A laboratory simulation of the bleaching sequence with filtrate recycle as depicted in FIG. 2 was conducted. A mill softwood pulp (Kappa 14.2) taken from the second stage of post oxygen washing, similar to washer 38 in FIG. 2, was bleached using the scheme in FIG. 2. In these runs sodium hydroxide was substituted for oxidized white liquor. Fresh mill pulp from the second post oxygen washer was bleached in repeated runs. Filtrates from each run were saved and applied in the manner shown in FIG. 2 during the succeeding run. This was continued until equilibrium dissolved solids were established in the recycling filtrates. Chlorine dioxide was completely substituted for molecular chlorine in these runs.

Results of metal removal in the acid treatment stage are shown in the following Table 6:

TABLE 6

ACID LEACHING OF OXYGEN DELIGNIFIED PULPS

|  | Na | K | Mg | Ca | Mn | Fe | Al |
|---|---|---|---|---|---|---|---|
| metals in Hardwood Pulp, ppm | | | | | | | |
| As Is: | 2765 | 273 | 572 | 1358 | 66 | 11 | 26 |
| After leaching: | 124 | 32 | 29 | 66 | 4 | 6 | 9 |
| % Removed: | 95 | 88 | 94 | 95 | 93 | 54 | 65 |
| Metals in Softwood Pulp, ppm | | | | | | | |
| As Is: | 6498 | 667 | 382 | 2529 | 88 | 16 | 22 |
| After Leaching: | 180 | 30 | 15 | 97 | 4 | 7 | 5 |
| % Removed: | 97 | 96 | 96 | 96 | 95 | 56 | 77 |

The acid treatment stage was conducted at pH 2. More than 90% of the sodium, magnesium, calcium, and manganese present in the oxygen delignified and washed pulp was removed during acid treatment. Removal of potassium, iron and aluminum was lower, about 88% for potassium, 54% for iron and 65% for aluminum.

Bleach chemicals demand and final brightness achieved during these recycle procedures are shown in the following Table 7 and are compared to lab bleaching of the same softwood pulp without filtrate recycle.

TABLE 7

Laboratory Bleaching of Oxygen Delignified Softwood Pulp With and Without Bleach Plant Filtrate Recycle Kappa number after oxygen delignification 14.2; Viscosity 15.1 cp.

|  | Without Recycle | With Recycle |
|---|---|---|
| First Chlorine Dioxide Stage: | | |
| Chlorine dioxide, % as active chlorine | 3.13 | 3.13 |
| Chlorine dioxide, % as chlorine dioxide | 1.19 | 1.19 |
| Final pH | 1.9 | 1.8 |
| Oxidative Extraction Stage: | | |
| Sodium Hydroxide applied, % | 1.3 | 1.8 |
| Final pH | 11.2 | 11.3 |
| CEK No. | 2.1 | 2.1 |
| Brightness | 52.4 | 51.1 |
| Viscosity, cp | 14.4 | 14.0 |
| Second Chlorine Dioxide Stage: | | |
| Chlorine Dioxide, % as chlorine dioxide | 1.0 | 1.25 |
| Final pH | 3.2 | 3.1 |
| Brightness[1] | 86 | 86 |
| Viscosity, cp | 12.7 | 13.1 |

[1]Chlorine dioxide requirement to achieve 86 brightness interpolated from several bleaching experiments.

A modest increase in both sodium hydroxide, 0.5%, and chlorine dioxide, 0.25%, was observed for the case of filtrate recycle compared to no filtrate recycle. Targeted brightness of 86 was achieved in both cases viscosity was similar.

EXAMPLE IV

Figure 5:
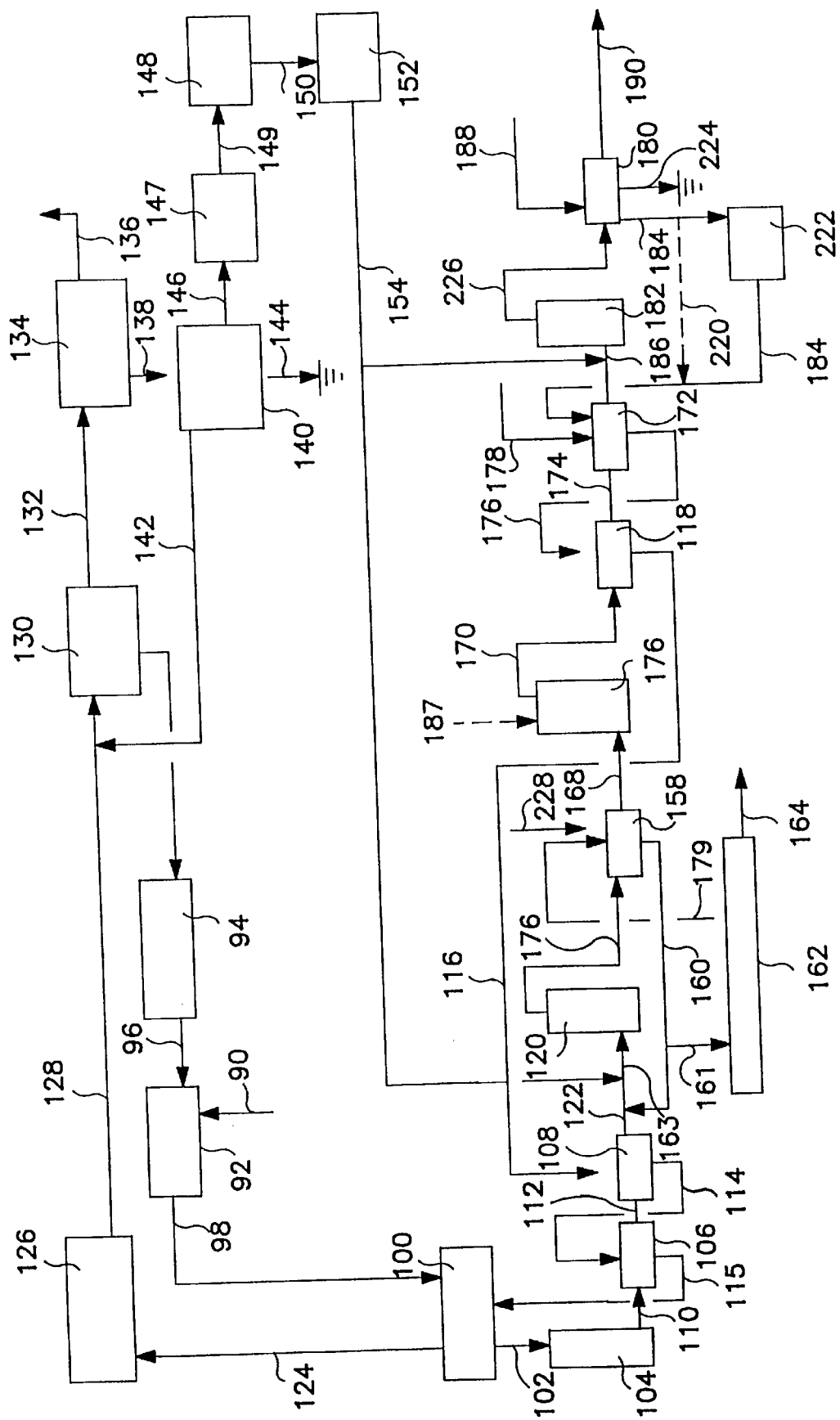
FIG. 5 is a schematic illustration of a preferred embodiment of this invention.
Figure 6:
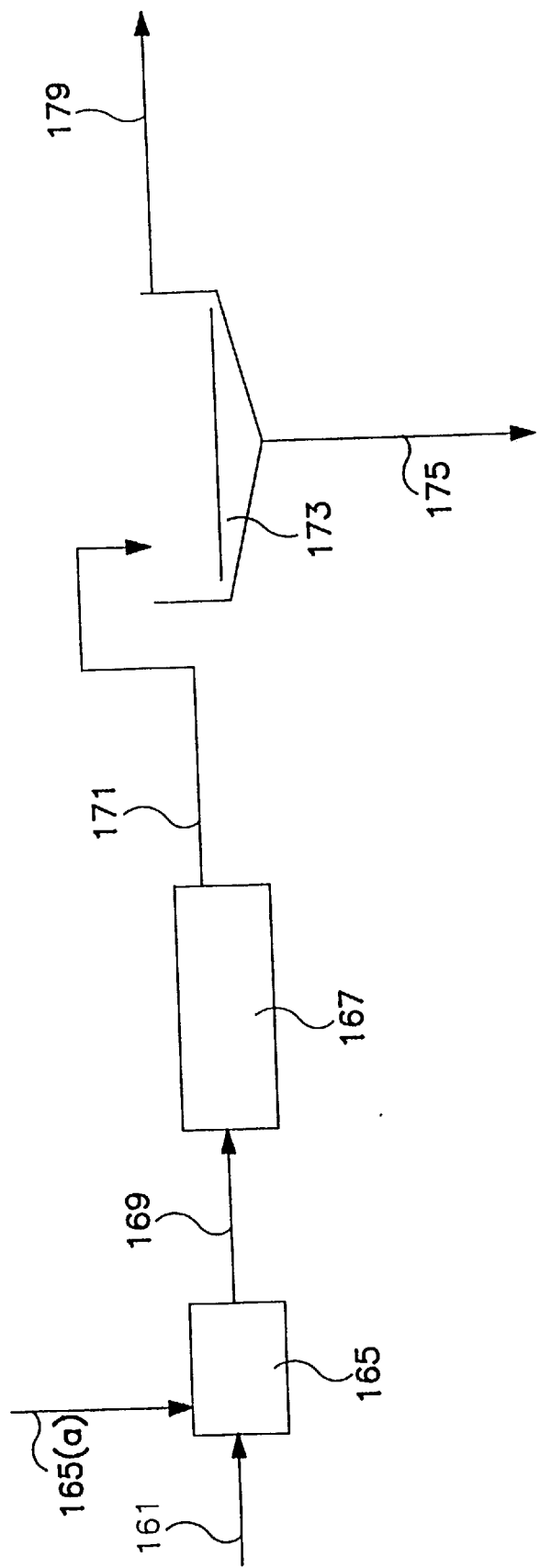
FIG. 6 is a schematic illustration of a preferred precipitation procedure for removal of non-process metals from acidic bleaching stage filtrate.

Referring to FIG. 5 of the drawings, wood chips or other comminuted cellulosic fibrous material is fed via line 90 to a continuous digester 92 where the materials are subjected to pulping action of a pulping liquor generated in causticizer 94 and conveyed to digester 92 via line 96. A variety of pulping procedures may be used such as the Kraft, soda, soda-oxygen, $H_2S$-pretreatment Kraft, alkaline, polysulfide and alkaline sulfite processes. In FIG. 5, the process will be described with particular reference to the preferred Kraft process in which the active pulping chemicals are contained in a white liquor comprising sodium hydroxide and sodium sulfide. The liquor will preferably comprise from about 15 to 22% sodium hydroxide and from about 20 to 40% sulfide and the digesting temperature and pressure are preferably from about 310° F. to about 350° F. and from about 80 psi to 110 psi, respectively. The resulting pulp, usually having a Kappa number of greater than about 30, is fed via line 98 to brown stock washing stage 100 for at least one stage of washing, preferably from two to about four stages of washing and more preferably about three stages of washing to remove all or a portion of entrained pulping liquor. After brown stock washing the washed pulp is charged via line 102 to oxygen delignification stage 104. In the oxygen delignification stage 104, the pulp is treated with oxygen, preferably in the presence of base such as sodium hydroxide, and at elevated temperature and at elevated pressure to reduce the Kappa number of the pulp to less than 30, preferably less than about 25, more preferably from about 5 to about 20 and most preferably from about 14 to about 20 for hardwood pulp and from about 8 to about 18 for pulp. While oxygen delignification is used in the preferred embodiments of this invention depicted in the drawing to reduce the Kappa Number of the pulp to the desired value other conventional procedures can be used. The oxygen delignified pulp is then subjected to at least one stage of post oxygen delignification washing, preferably from 2 to about 4 stages, where the oxygen delignified pulp is washed. While the washer employed in the preferred embodiments of the invention is a press washer, the type of washer used may vary widely and other conventional washers, as for example a CB washer, drum washer, belt washer, press washer, diffusion washer, two stage washer, and the like may be used. In FIG. 6, the pulp is conveyed to two post oxygen delignification washers 106 and 108 via lines 110 and 112, respectively, to further remove lignin and inorganic materials. Wash water from at least one of the post oxygen delignification washers, preferably, the last washer 108 is obtained by countercurrent recycle of filtrate from at least one post alkaline bleaching washer 118. As depicted in FIG. 6, the wash water for each post oxygen delignification washer is derived by countercurrent recycle of the wash water from a subsequent, preferably the next subsequent, post oxygen delignification washer. For example as shown in FIG. 5, the wash water for washer 106 is derived by countercurrently recycling the wash water from washer 108 via line 114. The wash water for the last post oxygen delignification washer 108 is derived from filtrate from post alkaline bleaching washing stage 118 which is recycled counter currently to washer 108 via line 116, and as will be described above is itself a combination of filtrates from first acid bleaching stage 120 and post alkaline bleaching washing stage 118. If the filtrates from any subsequent bleaching stages are recycled, the recycled filtrate also includes such filtrates. As depicted in the figure, the filtrate from post alkaline bleaching washing stage 118 is directly recycled to washer 108, however, it should be appreciated that the filtrate can be stored in some holding tank (not depicted) prior to use, or can be recycled to washer 106 rather than washer 108 or directly to brown stock washing 100. The only requirement is that all or a portion of these filtrates ultimately reach the weak black liquor flowing to evaporator 126 thus entering the recovery system. As depicted in the figure, the combined filtrates from the post oxygen delignification washers 106 and 108 are recycled countercurrently via line 115 to brown stock washing stage 100 to form a weak black liquor which is conveyed via line 124 to evaporator 126 where the organic and inorganic materials contained in the counter currently recycled filtrates and the spent pulping liquor are concentrated into a strong black liquor. Strong black liquor is conveyed via line 128 to recovery boiler 130 where the strong black liquor is combusted to produce a smelt and a flue gas comprising particles of chlorides from recycled bleach plant filtrates from wood entering the process or from combination thereof and sulfates which may have been present in the strong black liquor. The flue gas is conveyed via line 132 to electrostatic precipitator 134 where the particles comprising chlorides and sulfates are collected as ash. The stack gas is vented via line 136 and the ash is conveyed via line 138 to chloride and sulfate separator 140. The ash is treated in separator 140 to form a component rich in chlorides and if sulfates are present a component rich in sulfates.

Any conventional procedure known to those of skill in the art to separate chlorides and sulfates can be used. In the preferred embodiments of the invention because of the differing solubilities of chloride and sulfate salts in water, leaching and crystallization techniques can be employed. For example, the ash can be treated with water which dissolves the more soluble chlorides and potassium compounds forming a solution rich in these materials and a solid phase rich in sulfates. The aqueous and solid phases can be separated by conventional techniques such as filtration.

The component rich in sulfates is conveyed via line 142 and added to the strong black liquor prior to combustion in recovery boiler 130. The component rich in chlorides can be discharged from separator 140 via line 144 as for example to the sewer or can be treated to recover its chlorine value. For example, the component rich in chlorides can be conveyed via line 146 to purification unit 147 in which the chlorides are purified employing conventional techniques and is then conveyed to the chlorate generator conversion unit 148 via line 149 for conversion of chlorides to chlorates. The resulting chlorates can be conveyed via line 150 to chlorine dioxide generator 152 where chlorates are converted into chlorine dioxide which can be conveyed to chlorine dioxide bleaching stages 120 by some conveying means 154 for use in the acidic bleaching stages as will be described in more detail below, if chlorine dioxide is used as the active bleaching agent in the acidic bleaching stage.

Alternatively, purified sodium chloride can be converted into an aqueous solution which can be used to regenerate the ion exchange resin which may be used in metals removal unit 162 as described in more detail below employing means not depicted in the figure.

After the last post oxygen washing stage 108, the pulp preferably has a consistency of from about 2% to about 14%. The pulp can be stored in a storage tank (not depicted) until required for the first acidic bleaching stage 120 or conveyed directly to stage 120 via line 122 as depicted in the figure. In acidic bleaching stage 120, the pulp is bleached under acidic conditions with a bleaching agent such as elemental chlorine, ozone, chlorine dioxide, peracids and the like. In the preferred embodiments of the invention as depicted in the figure, the bleaching agent is ozone or chlorine dioxide comprising less than about 30%, preferably less than about 20%, more preferably less than about 10% and most preferably less than about 5% of the active bleaching agent is elemental chlorine. In the embodiments of the invention of choice, the active bleaching agent is ozone or chlorine dioxide which contains no or substantially no elemental chlorine (i.e. less than about 1% to about 5%). The application rates, pHs, times and temperatures used in the acidic bleaching stage may vary widely and any known to the art can be used.

The bleached pulp is conveyed via line 156 to at least one post acidic bleaching stage washer or decker 158. All, or preferably a portion of the filtrate from washer 158 which contains non-process metals is conveyed via line 160 and 161 to metals removal unit 162 where all or a portion of the non-process metals are removed from the filtrate and discharged via line 164. The untreated filtrate from washer 158 and the treated filtrate from metals removal unit 162 can be discharged from the process (not depicted) or can be recycled through the process. In the preferred embodiments of the invention, all or a portion of these filtrates are recycled. In the preferred embodiments, the use of such filtrate usually will be dictated by the requirements of the system, as for example the consistency of the pulp exiting washer 108 and whether such consistency is too high for optimum performance in the first acidic bleaching stage 120 because of process, apparatus limitations and other limitations. For example, the untreated filtrate can be recycled via line 160 to point 163 to dilute pulp from washer 108 when the consistency of such pulp is too high because of apparatus and process restrictions for use in acidic bleaching stage 120. Similarly, if consistency need not be modified, untreated filtrate can be conveyed as wash water to one or more post-oxygen delignification washing stages, one or more brown stock washing stages or a combination thereof. Similarly, filtrate treated in unit 162 and containing a reduced amount of non-process metals can be used as wash water on washing stage 158, on post oxygen delignification washing stage 106 and or 108 and or brown stock washing stage, discharged from the process or a combination thereof. As depicted in the figure, the filtrate containing reduced non-process metals is recycled to washer 158 as wash water via line 179, and the portion of filtrate from washer 158 not conveyed via line 160 to metals removal unit 162 is conveyed via line 160 to point 163 dilute pulp prior to conveyance to bleaching stage 120 because in the embodiment of the figure the consistency of the pulp from washer 108 is too high for use in acidic bleaching stage 120. Any suitable procedure for removing metals from an aqueous phase can be used in metals removal unit 162. In one preferred embodiment of the invention, the non-process metals are removed by precipitation caused by increasing the pH of the filtrate. For example as depicted in FIG. 6, filtrate from first acidic bleaching stage 120 and washer 158 having a pH of less than 7, usually from about 2 to about 4 is conveyed via line 161 to flash mixer 165 where a base such as sodium hydroxide and/or sodium bicarbonate is added via line 165(*a*) in sufficient amount to raise the pH of the filtrate to greater than 7, preferably from about 8 to about 11, which causes non-process metal salts such as hydroxides and/or carbonates which are insoluble under alkaline conditions to precipitate from the filtrate. The mixture of liquid phase and precipitates is conveyed to flocculator 167 via line 169 where the precipitate is allowed to flocculate, after which the mixture of aqueous phase and flocculated precipitate is conveyed via line 171 to sedimentation unit 173. In unit 173, the flocculated precipitate and the aqueous phase separate by sedimentation. The precipitate is removed from unit 173 via line 175 and discharged and the aqueous phase is conveyed via line 177 to washer 158 via line 179.

Figure 7:
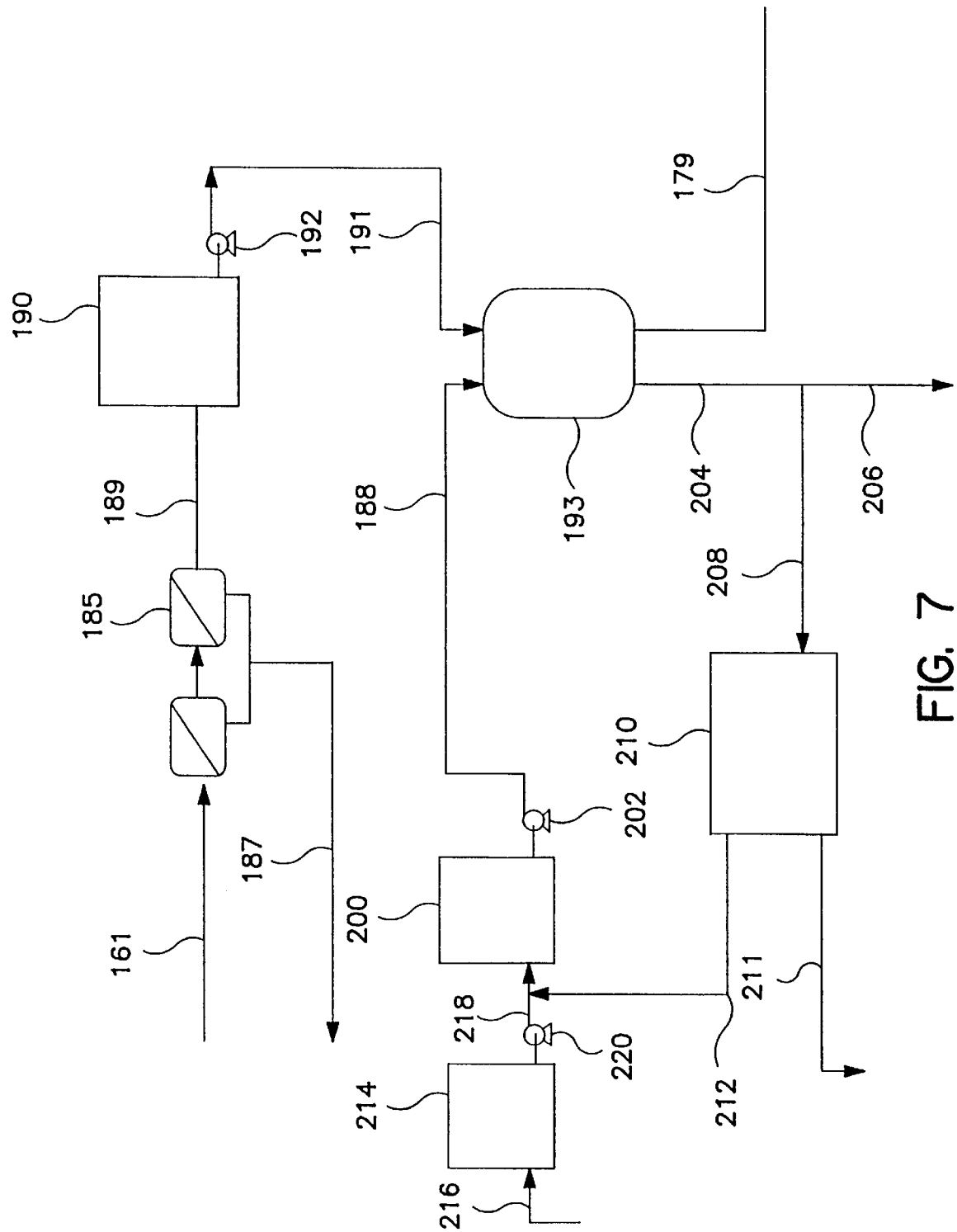
FIG. 7 is a schematic illustration of a preferred ion exchange procedure for removal of non-process metals from acidic bleaching stage filtrate.

In another preferred embodiment of the invention, the non-process metals are removed by ion exchange techniques. For example, as depicted in FIG. 7, filtrate from first acidic bleaching stage 120 and washer 158 is conveyed via line 161 to solid removal unit 185 where fibrous solids are removed. Any conventional process can be used to remove fibrous solids such as filtration, sedimentation, air flotation, centrifugation and the like. Separated fibrous solids are conveyed to the alkaline bleaching stage 166 via line 187 or disposed of in any suitable manner and the treated filtrate is conveyed to ion exchange feed tank 190 via line 189 where the filtrate can be held until used. Alternatively, the filtrate can be conveyed directly to ion exchange unit 193 by means not depicted. When required for use, the filtrate is conveyed to unit 193 from tank 190 via line 191 under force of pump 192. In unit 189, all or a portion of the non-process metals are removed from the filtrate and the treated filtrate is discharged (not depicted), conveyed to washer 158 via line 179 or is conveyed to at least one post oxygen delignification washing stage (means not depicted) and used as wash water or is conveyed by means not depicted to a point in the process after the last post oxygen delignification washing stage 108 and prior to first acidic bleaching stage 120 (means not depicted), is used to dilute pulp prior to the acidic bleaching stage 120 (means not depicted), conveyed to at least brown stock washing stage as wash water (means not depicted) or a combination thereof.

As depicted in FIG. 7, a unit 193 has reached its capacity for removed metals, it can be treated with a regenerated stream introduced into unit 193 via line 188 from storage tank 200 under force of pump 202. As the regenerate stream ions contained in the stream preferentially are exchanged with non-process metals retained in the cationic exchange resin forming a waste regenerant stream which comprises such metals which exits unit 193 via line 204. The waste regenerant stream may be discharged from the process via line 206 as for example to the sewer or may be conveyed via line 208 to regeneration unit 210 where all or a portion of the non-process metals are removed from the stream to form a stream containing reduced non-process metal content which is then conveyed to tank 200 via line 212 for further use in the process. Any process can be employed in unit 210 for removal of non-process metals. In the preferred embodiments of the invention as depicted in the figure, non process metals are removed by adjusting the pH to a value greater than 7 by adding base such as sodium hydroxide, sodium carbonate or a combination thereof which precipitates non-process metals, and separating the precipitated non-process metals by some suitable technique as for example sedimentation, filtration, centrifugation or the like. The aqueous stream having reduced metal content is then recycled as described above and the separated metal precipitate can be discharged via line 211 and disposed of in some suitable way.

As depicted in FIG. 7, when additional regenerate solution is required, the solution having the required ions in the required amounts is formed in make down tank 214 from water and some regenerate source (as, for example, sodium salts such as sodium chloride as for example sodium chloride from chloride removal unit 140, sodium sesqui-sulfate from the chlorine dioxide generator (not depicted) or sodium sulfate) which is introduced into tank 214 via line 216. The solution is then conveyed when needed to tank 200 via line 218 under force of pump 220.

After washing on washer 158, the pulp, preferably where the amount of non-process metals is such that the alkaline bleaching process adversely affect to an undue extent, is conveyed via line 168 to alkaline bleaching stage 166 where the pulp is bleached under alkaline conditions. While any suitable alkaline bleaching agents and conditions can be used, in the preferred embodiments of the invention, alkaline bleaching stage 166 is oxidative extraction with oxygen in the presence of base preferably carried out in the presence of peroxide, employing conventional oxidative extraction times, pressures and temperatures.

After alkaline bleaching stage 166, the pulp is subjected to at least one post alkaline bleaching washing stage 166 preferably from 1 to about 6, more preferably from 2 to about 4 and most preferably 1 post alkaline bleach washing stages. As depicted in FIG. 5 there are 2 post alkaline bleaching stages. In this embodiment of the invention, the alkaline bleached pulp is conveyed from alkaline bleach stage 166 via line 170 to post alkaline bleach stage washer 118 and from washer 118 to optional washer 172 via line 174. The wash water from washer 118 is derived by countercurrently recycling the wash water from washer 172 to washer 118 via line 176. If there are more than two post alkaline bleaching washing stages, for all or a portion of these stages other than the last post alkaline bleaching washing stage, wash water is preferably derived by countercurrently recycling wash water from a subsequent, preferably the next subsequent, post alkaline bleaching washing stage. In this manner, all or a portion of the filtrates from all or a portion (preferably all) post alkaline bleaching washing stage are combined in the filtrate from the first post alkaline bleaching washing stage which can then be directly or indirectly recycled countercurrently as wash water to a post oxygen delignification washing stage (preferably the last post oxygen delignification washing stage) as for example via line 116 to post oxygen delignification washer 108, and thereafter to brown stock washing and to the recovery system where chlorides can be removed from the process. Wash water for the last post alkaline bleaching washing stage 172 or for those preferred embodiments of the invention where there is only one post alkaline washing stage 118 can be obtained from any convenient source as for example fresh water or water recycled from the mill such as water recycled from a subsequent bleaching stage. For example, where the process includes no further bleaching stages the wash water can be non-bleach plant water obtained from other aqueous streams such as in the paper mill or from the fresh water system. If the process includes other bleaching stage, fresh non-bleach stage water can be used, or filtrates from one or more of these subsequent bleaching stages can be countercurrently recycled in the last post alkaline bleach stage washer as described below such that these filtrates are combined in the filtrate countercurrently recycled via line 116 to a post oxygen delignification stage washer 108 as wash water and ultimately to brown stock washing stages 100 and to the recovery system. A portion of the filtrate may also be countercurrently recycled via lines 116 and 228 to washer 158 as wash water. For example as depicted in FIG. 5, wash water from last post alkaline bleach stage washer 172 can be fresh water introduced via line 178 or filtrate conveyed from washing stage 180 of bleaching stage 182 via line 184. The filtrate from washing stage 180 can be discharged from the process or can be countercurrently recycled directly to washing stage 172 via line 220. Alternatively, if chlorine based bleaching agents are employed and the bleaching stage results in the production of chlorides can be treated to remove all or a portion of the chlorides by some suitable technique in unit 222, as for example an anionic ion exchange process, prior to use as wash water on washing stage 172, if deficiencies in the recovery system will not allow recovery of additional chlorides from a chlorine based bleaching stage 182.

The pulp can be processed from system and used for conventional purposes or the pulp can be subjected to one or more additional acidic and/or alkaline bleaching stages as for example further bleaching with one or more bleaching agents selected from the group consisting of peroxide, chlorine dioxide and ozone. Such additional bleaching stages may be without subsequent washing or may be followed by subsequent wash stage or stage(s) in which the wash water is either discharged from the process, is countercurrently recycled as wash water substantially as described above for washing stages 172 and 118 through at least one post oxygen delignification stage through brown stock washing and ultimately to the recovery system. For example, in the embodiment of FIG. 6, the washed alkaline bleached pulp is conveyed via line 186 to a second acidic bleaching stage 182 where the pulp is bleached substantially as described below for first acidic bleaching stage 120. After bleaching, the pulp can be subjected to further bleaching stage(s) without washing, or as depicted in FIG. 6 can be conveyed via line 226 to at least one post acidic bleaching washing stage 180 where the pulp is washed preferably with fresh water introduced via line 188. The fully processed pulp exits the bleaching sequence via line 190 for conventional use as for example in a paper making process and the washed water is countercurrently recycled via lines 184 and/or 220 as wash water to washing stage 172, discharged from the process via line 224 or a combination thereof.

Many variations of the present invention will suggest themselves to those of ordinary skill in the art in light of the above-detailed description. All such obvious modifications are within the full intended scope of the appended claims.

What is claimed is:

1. A process for manufacturing bleached wood comprising subjecting wood pulp having a Kappa Number equal to or less than about 30 after at least one brown stock washing stage to the following steps:
    a first acidic bleaching stage wherein the pH at some point during said bleaching stage is less than 7; and
    an oxidative alkaline extraction stage wherein the pH at some point during said extraction stage is greater than 7; and said process further comprising:
    subjecting said pulp to an acid wash wherein the pH at some point during said acid wash is less than 7, prior to said first acidic bleaching stage to remove all or a portion of non-process metals contained in said pulp;
    recycling countercurrently all or a portion of the filtrate from said first acidic bleaching stage and all or a portion of the filtrate from said oxidative alkaline extraction stage as wash water to said at least one brownstock washing stage and to a weak black liquor to form a weak black liquor which comprises said recycled filtrates;
    recycling said weak black liquor to a black liquor evaporation stage to produce a strong black liquor which comprises chloride and/or potassium salts and sulfur containing compounds;
    combusting said strong black liquor to produce a smelt stream and a flue gas comprising particulates which comprise chloride and/or potassium salts and sulfur containing compounds and separating said smelt stream and said flue gas;
    treating said flue gas to separate said particulates as ash, and treating said ash to form a component relatively low in chloride and/or potassium salts and relatively rich in sulfur containing compounds and a component comprising chloride and/or potassium salts; and
    recycling said component relatively low in chloride and/or potassium salts and relatively rich in sulfur containing compounds to the strong black liquor and discharging said component comprising chloride and/or potassium salts; and
    recycling said smelt to a causticizing system to regenerate pulping liquor.

2. Process of claim 1 wherein said Kappa Number is equal to or less than about 25.

3. Process of claim 2 wherein said Kappa Number is equal to or less than about 20.

4. Process of claim 3 wherein said first acidic bleaching stage is carried out with a bleaching agent comprising less than about 30% elemental chlorine as the active bleaching agent.

5. Process of claim 4 wherein said bleaching agent is chlorine dioxide, ozone or a combination thereof, comprising less than about 10% elemental chlorine as the active bleaching agent.

6. Process of claim 4 wherein said bleaching agent is chlorine dioxide or ozone comprising less than about 5% elemental chlorine as the active bleaching agent.

7. Process of claim 5 wherein said bleaching agent comprises chlorine dioxide.

8. Process of claim 5 wherein said bleaching agent comprises ozone.

9. Process of claim 1 wherein said oxidative alkaline is in the presence of hydrogen peroxide.

10. Process of claim 1 which further comprises:
    subjecting said pulp after said oxidative alkaline extraction stage to at least one post oxidative alkaline extraction washing stage to form a mixture comprising pulp and aqueous oxidative alkaline extraction stage filtrate comprising oxidative alkaline extraction stage solids;
    recovering all or a portion of said aqueous oxidative alkaline extraction stage filtrate and recycling recovered filtrate countercurrently to said weak black liquor;
    subjecting said pulp after said first acidic bleach stage to at least one post acidic bleaching washing stage to form a mixture comprising pulp and aqueous acidic bleach filtrate comprising acidic bleach solids; and
    recovering all or a portion of said aqueous acidic bleach filtrate and recycling recovered filtrate countercurrently to said weak black liquor.

11. Process of claim 10 which further comprises:
    combining all or a portion of said first acidic bleach filtrate recovered and all or a portion of said oxidative alkaline extraction stage filtrate to form a combined filtrate, and recycling countercurrently said combined filtrate to said weak black liquor.

12. Process of claim 10 which further comprises:
    subjecting pulp to a partial neutralization stage after the first acidic bleaching stage in which the pH of said pulp is raised to a value of from about 5 to 7 with filtrate from said oxidative alkaline extraction stage.

13. Process of claim 10 which further comprises:
    treating pulp after brown stock washing and prior to said acidic wash in any oxygen delignification stage to reduce the Kappa Number of the pulp to a desired level followed by at least one post oxygen delignification washing stage.

14. Process of claim 13 which further comprises:
    recycling all or a portion of said first acidic bleach filtrate, said oxidative alkaline extraction stage filtrate or a combination thereof countercurrently as wash water through at least one brown stock washing stage, through at least one post oxygen delignification washing stage or sequentially through at least one post oxygen delignification washing stage and at least one brown stock washing stage then to the black liquor.

15. Process of claim 14 further comprising:
   subjecting oxidative alkaline extracted pulp to at least one additional bleaching stage after said post oxidative alkaline extraction washing stage; and
   recycling countercurrently through said at least one post oxygen delignification washing stage, said at least one brown stock washing stage or sequentially through at least one post oxygen delignification washing stage and at least one brown stock washing stage as wash water all or a portion of the filtrate from said first acidic bleaching stage; from said post oxidative alkaline extraction washing stage; and from said at least one additional bleaching stage.

16. Process of claim 15 wherein said at least one additional bleaching stage comprises bleaching with a bleaching agent selected from the group consisting of peroxide, ozone and chlorine dioxide comprising less than 10% elemental chlorines.

17. Process of claim 15 further comprising;
   treating all or a portion of the filtrate from the acid wash to remove all or a portion of non-process metals from said filtrate and recycling all or a portion of said treated filtrate as wash water to the at least one post oxygen delignification washing stages, to the at least one post oxidative alkaline extraction washing stage or a combination thereof; or
   discharging all or a portion of said filtrate from said acid wash; or
   a combination thereof.

18. Process of claim 1, wherein said treating comprises:
   increasing the pH of all or a portion of the acidic wash filtrate to greater than 7 by addition of base, thereby precipitating all or a portion of non-process metals to form a mixture of treated filtrate and precipitated non-process metals; and
   separating said precipitated non-process metals and said treated filtrate.

19. Process of claim 1, wherein said treating comprises:
   contacting all or a portion of said acidic wash filtrate and a cationic ion exchange resin.

20. Process of claim 1 which further comprises:
   an oxygen delignification stage followed by at least one post oxygen delignification washing stage prior to said first acidic bleaching stage to form oxygen delignified pulp;
   a neutralization stage in which bleached pulp from said first acidic bleaching stage is neutralized with a filtrate from said subsequent oxidative alkaline extraction stage; and
   at least one post oxidative alkaline extraction washing stage to remove all or a portion of bleach solids from a oxidative alkaline extraction pulp to form a washed oxidative alkaline extraction pulp;
said process further comprising:
   subjecting said pulp to an acid wash after said at least one post oxygen delignification washing stage and prior to said first acidic bleaching stage to remove all or a portion of non-process metals contained in said pulp; and
   recycling countercurrently all or a portion of the filtrate from said first acidic bleaching stage and all of a portion of the filtrate from said oxidative alkaline extraction stage as wash water sequentially through the at least one post oxygen delignification washing stage and at the least one brown stock washing stage to form a weak black liquor which comprises said recycled filtrates.

21. Process of claim 20, wherein said oxidative extraction stage is carried out in the presence of an effective amount of hydrogen peroxide.

22. Process of claim 21 which further comprises at least one additional bleaching stage after said post oxidative extraction washing stage, wherein said bleaching agent is selected from the group consisting of ozone, peroxide and chlorine dioxide comprising less than about 10% elemental chlorine.

23. Process of claim 22 which further comprises:
   recycling counter-currently through said at least one post oxygen delignification washing stage and said at least one brown stock washing stage as wash water all or a portion of filtrates from said first acidic bleaching stage; from said partial neutralization; from said oxidative extraction stage; from said at least one post oxidative extraction washing stage; and from said at least one additional bleaching stage.

24. Process of claim 20 further comprising:
   bleaching the oxygen delignified pulp in said first acidic bleaching stage with ozone or chlorine dioxide containing less than about 10% elemental chlorine to form a first bleached pulp;
   extracting the first acidic bleached pulp in said oxidative alkaline extraction stage in the presence of peroxide to form extracted pulp;
   bleaching pulp from said at least one post extraction washing stage in one or more additional bleaching stages with ozone, peroxide or chlorine dioxide containing less than about 10% elemental chlorine and washing pulp after at least one of said additional bleaching stages; and
   discharging the filtrate from said washing after said at least one additional bleaching stage, recycling counter-currently all or a portion of said filtrate from said at least one washing to said at least one post oxidative alkaline extraction washing stage as wash water, recycling countercurrently all or a portion of said filtrate to said at least one post oxygen delignification washing stage as wash water or a combination thereof.

25. Process of claim 1, wherein said treating comprises:
   increasing the pH of all or a portion of the acidic wash filtrate to greater than 7 by addition of base, thereby precipitating all or a portion of non-process metals to form a mixture of treated filtrate and precipitated non-process metals; and
   separating said precipitated non-process metals and said treated filtrate.

26. Process of claim 1, wherein said treating comprises:
   contacting all or a portion of said acidic wash filtrate and a cationic ion exchange resin.

27. A process for bleaching wood pulp comprising subjecting the wood pulp after brown stock washing to the following steps:
   a first acidic bleaching stage wherein the pH at some point during said bleaching stage is less than 7; and
   an oxidative alkaline extraction stage wherein the pH at some point during said bleaching stage is greater than 7 and said process further comprising:

treating all or a portion of filtrate from said first acidic bleaching stage to remove from said filtrate all or a portion of non-process metals contained in said pulp to form treated filtrate;

recycling countercurrently all or a portion of said treated filtrate from said first acidic bleaching stage and all or a portion of filtrate from said oxidative alkaline extraction stage as wash water to said at least one brownstock washing stage to a weak black liquor forming a weak black liquor which comprises said recycled filtrates;

recycling said weak black liquor to a black liquor evaporation stage to produce a strong black liquor which comprises chloride and/or potassium salts and sulfur containing compounds;

combusting said strong black liquor to produce a smelt stream and a flue gas comprising particulates which comprise chloride and/or potassium salts and sulfur containing compounds and separating said smelt stream and said flue gas;

treating said flue gas to separate said particulars as ash and treating said ash to form a component comprising chloride and/or potassium salts and a component relatively low in chloride and/or potassium salts and relatively rich in sulfur containing compounds; and recycling said component relatively low in chloride and/or potassium salts and relatively rich in sulfur containing compounds to said strong black liquor and discharging said component comprising chloride and/or potassium salts; and recycling said smelt to a causticizing system to regenerate pulping liquor.

28. Process of claim 27 wherein said Kappa Number is equal to or less than about 25.

29. Process of claim 28 wherein said Kappa Number is equal to or less than about 20.

30. Process of claim 29 wherein said first acidic bleaching stage is carried out with a bleaching agent comprising less than about 30% elemental chlorine as the active bleaching agent.

31. Process of claim 30 wherein said bleaching agent is chlorine dioxide, ozone or a combination thereof, comprising less than about 10% elemental chlorine as the active bleaching agent.

32. Process of claim 31 wherein said bleaching agent is chlorine dioxide or ozone comprising less than about 5% elemental chlorine as the active bleaching agent.

33. Process of claim 32 wherein said bleaching agent comprises chlorine dioxide as the bleaching agent.

34. Process of claim 33 wherein said bleaching agent comprises ozone as the bleaching agent.

35. Process of claim 27 wherein said oxidative alkaline extraction is in the presence of hydrogen peroxide.

36. Process of claim 27 which further comprises:

subjecting said pulp after said oxidative alkaline extraction stage to at least one post oxidative alkaline extraction washing stage to form a mixture comprising pulp and aqueous oxidative alkaline extraction stage filtrate comprising oxidative alkaline extraction solids;

recovering all or a portion of said aqueous oxidative alkaline extraction stage filtrate and recycling recovered filtrate countercurrently to said weak black liquor;

subjecting said pulp after said first acidic bleaching stage to at least one post acidic bleaching washing stage to form a mixture comprising pulp and aqueous acidic bleach filtrate comprising acidic bleach solids; and recovering all or a portion of said aqueous acidic bleach filtrate and recycling recovered filtrate countercurrently to said weak black liquor.

37. Process of claim 36 which further comprises:

combining all or a portion of said first acidic bleach filtrate and all or a portion of said oxidative alkaline extraction stage filtrate to form a combined filtrate and recycling countercurrently said combined filtrate to said weak black liquor.

38. Process of claim 36 which further comprises:

subjecting said pulp after said at least one brown stock washing stage and prior to the first acidic bleaching stage to an oxygen delignification stage to reduce the Kappa Number of the pulp to the desired value followed by at least one post oxygen delignification washing stage; and recycling countercurrently as wash water through said at least one post oxygen delignification washing stage, said at least one brown stock washing stage or sequentially through said at least one post oxygen delignification washing stage and said at least one brown stock washing stage all or a portion of said oxidative alkaline extraction stage filtrate, all or a portion of said first acidic bleach filtrate or a combination thereof prior to the weak black liquor.

39. Process of claim 38 which further comprises:

at least one additional bleaching stage after said post oxidative alkaline extraction washing stage.

40. Process of claim 39 which further comprises:

recycling countercurrently all or a portion of filtrate from said at least one additional bleaching stage as wash water through said at least one post oxidative alkaline extraction stage, said at least one post oxygen delignification washing stage, said at least one brown stock washing stage, discharging said filtrate or a combination thereof.

41. Process of claim 39 wherein said at least one additional bleaching stage comprises bleaching with a bleaching agent selected from the group consisting of ozone, peroxide, or chlorine dioxide containing less than about 10% elemental chlorine or a combination thereof.

42. Process of claim 40 which further comprises at least one washing stage after at least one of said at least one additional bleaching stage and recycling countercurrently filtrate from said washing stage as wash water through at least one oxidative alkaline extraction washing stage, said at least one post oxygen delignification washing stage, said at least one brown stock washing stage, discharging said filtrate or a combination thereof.

43. Process of claim 27 which further comprises:

an oxygen delignification stage followed by at least one post oxygen delignification washing stage prior to said first acidic bleaching stage to form oxygen delignified pulp; and using all or a portion of said alkaline bleach filtrate as wash water in said at least one post oxygen delignification washing stage.

44. Process of claim 43 wherein said treating comprises:

passing said filtrate through an cationic ion exchange resin having an affinity for said metals.

45. Process of claim 43 wherein said treating comprises:

raising the pH of said filtrate to a value greater than 7 by the addition of base whereby all or a portion of said metals precipitate forming a mixture of said precipitated metals and an aqueous phase; and separating said precipitated metals and said aqueous phase.

46. Process of claim 43 wherein said oxidative alkaline extraction stage is carried out in the presence of an effective amount of hydrogen peroxide.

47. Process of claim 46 which further comprises at least one additional bleaching stage after said at least one post oxidative alkaline extraction washing stage wherein the bleaching agent is selected from the group consisting of ozone, peroxide and chlorine dioxide comprising less than about 10% elemental chlorine.

48. Process of claim 47, wherein said at least one additional bleaching stage is followed by at least one washing stage.

49. Process of claim 48, which further comprises at least one post oxidative alkaline extraction washing stage, said at least one post oxygen delignification washing stage, recycling counter-currently through said washing sequence said at least one brown stock or a combination thereof all or a portion of said filtrates from said at least one additional acidic bleaching stage and from said washing stage.

50. Process of claim 27 for bleaching Kraft wood pulp comprising subjecting the wood pulp after brown stock washing stage to the following steps:

oxygen delignifying said wood pulp in the presence of oxygen and base followed by at least one post oxygen washing stage to form oxygen delignified pulp;

bleaching the oxygen delignified pulp in a first acidic bleaching stage with ozone or chlorine dioxide comprising less than about 10% elemental chlorine to form first bleached pulp;

extracting said first bleached pulp in an oxidative extraction stage in the presence of base and peroxide to form extracted pulp;

washing said extracted pulp on at least one post oxidative extraction washing stage to form washed extracted pulp;

bleaching said washed extracted pulp in at least one additional bleaching stage with a bleaching agent selected from the group consisting of peroxide, ozone and chlorine dioxide comprising less than about 10% elemental chlorine and washing pulp after at least one of said at least one additional bleaching stages to form a washed bleached pulp;

discharging the filtrate from said at least one washing after said at least one additional bleaching stage, recycling all or a portion of said filtrate from said washing after said at least one additional bleaching stages to said at least one post oxidative extraction washing stage as wash or a combination thereof; and recycling filtrate from said at least one post oxidative extraction washing stage as wash water to wash pulp in said at least one oxygen delignification washing stage.

51. Process of claim 50 wherein said treating comprises:

passing said filtrate through an cationic ion exchange resin having an affinity for said metals.

52. Process of claim 50 wherein said treating comprises:

raising the pH of said filtrate to a value greater than 7 by the addition of base whereby all or a portion of said metals precipitate forming a mixture of said precipitated metals and an aqueous phase; and separating said precipitated metals and said aqueous phase.

* * * * *